United States Patent
Mukae

(10) Patent No.: US 12,432,615 B2
(45) Date of Patent: Sep. 30, 2025

(54) ARTIFICIAL SATELLITE, SATELLITE COMMUNICATION SYSTEM, SPACE DATA CENTER, BUSINESS DEVICE, CONTENT DISTRIBUTION BUSINESS DEVICE, NETWORK BUSINESS DEVICE, SERVER BUSINESS DEVICE, SPACE DATA CENTER BUSINESS DEVICE, GROUND INSTALLATION, LOW-EARTH-ORBIT BROADBAND CONSTELLATION BUSINESS DEVICE, AND ON-DEMAND CONTENT DISTRIBUTION METHOD

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 9 days.

(21) Appl. No.: 18/691,050

(22) PCT Filed: Sep. 6, 2022

(86) PCT No.: PCT/JP2022/033448
§ 371 (c)(1),
(2) Date: Mar. 12, 2024

(87) PCT Pub. No.: WO2023/042712
PCT Pub. Date: Mar. 23, 2023

(65) Prior Publication Data
US 2024/0396601 A1    Nov. 28, 2024

(30) Foreign Application Priority Data

Sep. 17, 2021 (WO) .................. PCT/JP2021/034402

(51) Int. Cl.
*H04L 5/12* (2006.01)
*H04B 7/06* (2006.01)
(Continued)

(52) U.S. Cl.
CPC .......... *H04W 28/08* (2013.01); *H04B 7/0608* (2013.01); *H04W 72/0457* (2023.01)

(58) Field of Classification Search
CPC . H04W 28/08; H04W 72/0457; H04B 7/0608
(Continued)

(56) References Cited

U.S. PATENT DOCUMENTS

| 2013/0163705 A1 | 6/2013 | Stirland |
| 2019/0058672 A1* | 2/2019 | Scott ...................... H04Q 3/521 |

(Continued)

FOREIGN PATENT DOCUMENTS

| JP | 2012-175330 A | 9/2012 |
| JP | 2013-529870 A | 7/2013 |

(Continued)

OTHER PUBLICATIONS

International Search Report and Written Opinion mailed on Nov. 30, 2021, received for PCT Application PCT/JP2021/034402, filed on Sep. 17, 2021, 9 pages including English Translation.
(Continued)

*Primary Examiner* — Zewdu A Kassa
(74) *Attorney, Agent, or Firm* — XSENSUS LLP

(57) ABSTRACT

An artificial satellite includes a recording device, a calculator, and a communication device. The communication device includes a beam control device and a beamforming device. The recording device has recorded therein information indicating communication traffic between the communication device and at least any of a plurality of gateways disposed on ground. When imbalances in communication traffic among the plurality of gateways are present, the (Continued)

calculator derives variable parameters for controlling the beamforming device so that the imbalances in the communication traffic among the plurality of gateways decrease, and transmits the derived variable parameters to the beam control device. The beam control device receives the variable parameters derived by the calculator and controls the beamforming device based on the received variable parameters.

28 Claims, 18 Drawing Sheets

(51) Int. Cl.
*H04W 28/08* (2023.01)
*H04W 72/0457* (2023.01)

(58) Field of Classification Search
USPC .............. 375/262, 260, 259, 219, 295, 316
See application file for complete search history.

(56) References Cited

U.S. PATENT DOCUMENTS

| | | |
|---|---|---|
| 2019/0123811 A1 | 4/2019 | Potter et al. |
| 2024/0014894 A1 | 1/2024 | Mukae |

FOREIGN PATENT DOCUMENTS

| | | |
|---|---|---|
| JP | 2020-537442 A | 12/2020 |
| JP | 2021-035319 A | 3/2021 |
| WO | 2011/161198 A1 | 12/2011 |
| WO | 2018/146750 A1 | 8/2018 |
| WO | 2019/079705 A1 | 4/2019 |
| WO | 2022/065256 A1 | 3/2022 |

OTHER PUBLICATIONS

International Search Report and Written Opinion mailed on Nov. 22, 2022, received for PCT Application PCT/JP2022/033448, filed on Sep. 6, 2022, 10 pages including English Translation.

* cited by examiner

ARTIFICIAL SATELLITE, SATELLITE COMMUNICATION SYSTEM, SPACE DATA CENTER, BUSINESS DEVICE, CONTENT DISTRIBUTION BUSINESS DEVICE, NETWORK BUSINESS DEVICE, SERVER BUSINESS DEVICE, SPACE DATA CENTER BUSINESS DEVICE, GROUND INSTALLATION, LOW-EARTH-ORBIT BROADBAND CONSTELLATION BUSINESS DEVICE, AND ON-DEMAND CONTENT DISTRIBUTION METHOD

CROSS-REFERENCE TO RELATED APPLICATIONS

This application is based on PCT filing PCT/JP2022/033448, filed Sep. 6, 2022, which claims priority to International Patent Application No. PCT/JP2021/034402, filed Sep. 17, 2021, the entire contents of each are incorporated herein by reference.

TECHNICAL FIELD

The present disclosure relates to an artificial satellite, a ground system, a satellite communication system, a space data center, a business device, a content distribution business device, a network business device, a server business device, a space data center business device, a ground installation, a low-earth-orbit broadband constellation business device, a satellite communication method, an on-demand content distribution method, and a live video content distribution method.

BACKGROUND ART

In a satellite communication system, with an increase in operation life in orbit, a flexible payload capable of dynamically addressing changes in communication traffic with time transitions of user needs has been awaited.

Also, studies have been advancing in which satellite-mounted devices are fully digitalized to optimize variable parameters supporting a frequency domain, a time domain, and a space domain, thereby utilizing satellite resources at maximum.

Also, cloud computing technology has been progressing. Furthermore, to reduce loads of a centralized processing scheme with a dramatic increase in data amount and enhanced speed of communication and to further increase the speed by parallel processing, process distribution and making into IoT (Internet of Things) have been advancing. However, when process distribution and making into IoT are achieved in a ground system installed on the ground, an increase in power consumption amount and an increase in exhaust heat amount with higher process speed pose problems.

CITATION LIST

Patent Literature

Patent Literature 1: WO 2018/146750 pamphlet

Summary of Invention

Technical Problem

In a satellite communication system adopting a flexible payload by the conventional technology as disclosed in Patent Literature 1, information indicating communication traffic of a plurality of gateways are collected in a NOC (Network Operation Center) on the ground; means for optimizing a frequency domain, a time domain, and a space domain to decrease imbalances in communication traffic indicated by the collected information is selected; an optimum value of a variable parameter of a communication device is derived based on the selected means; and the optimum value derived as a command value is transmitted to a satellite.

The present disclosure has an object of deriving a variable parameter value for controlling a beamforming device so that imbalances in communication traffic among the plurality of gateways decrease in an artificial satellite, thereby reducing loads in a ground system.

Solution to Problem

An artificial satellite according to the present disclosure includes:
a recording device;
a calculator; and
a communication device, wherein
the communication device includes a beam control device and a beamforming device,
the recording device has recorded therein information indicating communication traffic between the communication device and at least any of a plurality of gateways disposed on ground,
when imbalances in communication traffic among the plurality of gateways are present, the calculator derives variable parameter values for controlling the beamforming device so that imbalances in communication traffic among the plurality of gateways decrease, and transmits information indicating the derived variable parameter values to the beam control device, and
the beam control device receives the information indicating the variable parameter values derived by the calculator and controls the beamforming device based on the variable parameter values indicated by the received information.

Advantageous Effects of Invention

According to the present disclosure, the calculator included in the artificial satellite derives a variable parameter value for controlling a beamforming device so that, when imbalances in communication traffic among a plurality of gateways are present, the imbalances in communication traffic among the plurality of gateways decrease. Therefore, according to the present disclosure, in the artificial satellite, by deriving a variable parameter value for controlling the beamforming device so that the imbalances in the communication traffic among the plurality of gateways decrease, it is possible to reduce loads in the ground system.

DESCRIPTION OF EMBODIMENTS

Figure 1:
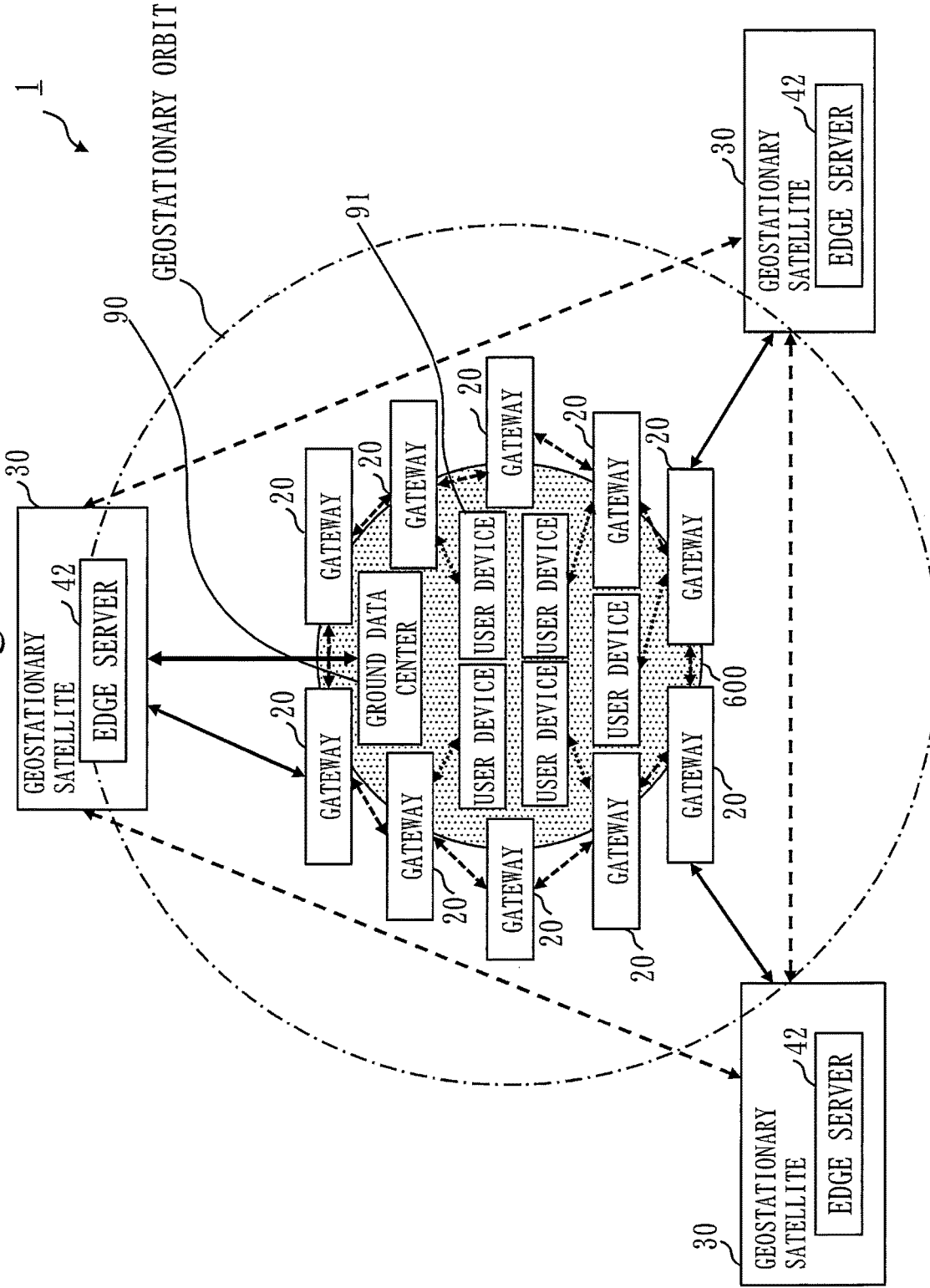
FIG. 1 is a diagram illustrating a general outline of a satellite communication system 1 according to Embodiment 1.

In the description of embodiments and the drawings, identical components and corresponding components are provided with identical reference characters. The description of the components provided with identical reference characters is omitted or simplified as appropriate. Arrows in the drawings mainly indicate flows of data or flows of processing. Also, "unit" may be read as "circuit", "step", "procedure", "process", or "circuitry" as appropriate. In the specification, an artificial satellite may be denoted simply as a satellite.

Embodiment 1

Hereinbelow, the present embodiment will be described in detail with reference to the drawings.

Description of Configuration

FIG. 1 illustrates a general outline of a satellite communication system 1.

The satellite communication system 1 includes geostationary satellites 30, a plurality of gateways 20, and a ground data center 90.

The geostationary satellites 30 each includes, as a specific example, an edge server 42. The geostationary satellites 30 can communicate with the gateways 20. Note that communication between the geostationary satellites 30 and the gateways 20 may be performed via a communication satellite. The geostationary satellites 30 may form a satellite constellation. The satellite communication system 1 may include, in place of the geostationary satellites 30, an artificial satellite that is not a geostationary satellite.

The gateways 20 are communication devices having a relay function and so forth, and is operated typically by a communication business entity.

The ground data center 90 is a data center disposed on the ground and, as a specific example, a data center for use in cloud computing. The ground data center 90 can communicate with the geostationary satellites 30. Note that communication between the ground data center 90 and the geostationary satellites 30 may be performed via a relay device or the like.

Also, on the earth 600, each user has a user device 91. The user device 91 is, as a specific example, a relay device owned by a company or the like as a user or a portable terminal owned by a user. The user device 91 can communicate with the gateways 20. Note that communication between the user device 91 and the gateways 20 may be performed via a relay device or the like.

Figure 2:
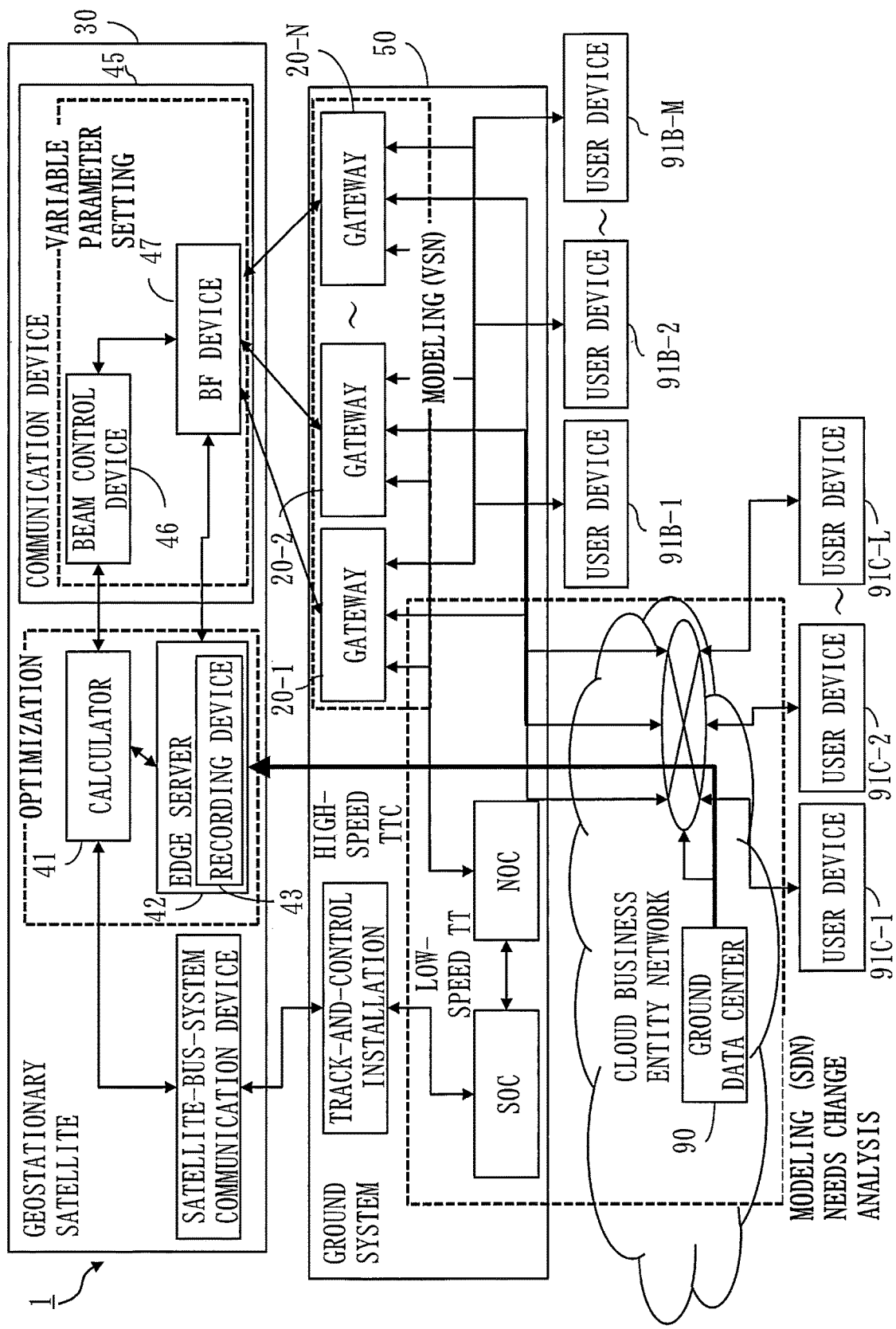
FIG. 2 is a diagram illustrating a configuration example of the satellite communication system 1 according to Embodiment 1.

FIG. 2 illustrates a configuration example of the satellite communication system 1. The satellite communication system 1 is formed of the geostationary satellite 30, a ground system 50, the ground data center 90, and the user devices 91. A representation such as "-1" is to distinguish between components that are plurally present. N, M, and L each indicate a natural number.

The ground system 50 includes a plurality of gateways 20, a track-and-control installation, a NOC (Network Operation Center), and a SOC (Security Operation Center).

User devices 91B are devices for use typically in BtoB (Business-to-Business). Typically, the user devices 91B are each owned by a company contracting with a communication business entity, or the like. User devices 91C are devices for use typically in BtoC (Business-to-Consumer). Typically, the user devices 91C are each owned by an individual contacting with a communication business entity.

The ground data center 90 is present inside a cloud business entity network, and is communicably connected to at least any of the plurality of gateways 20. The cloud business entity network is a network for use by a cloud computing business entity. A plurality of ground data centers 90 may be present and each ground data center 90 may be communicably connected to part of the plurality of gateways 20.

The geostationary satellite 30 includes a satellite-bus-system communication device to communicate with the track-and-control installation, a calculator 41, the edge server 42, and a communication device 45. The communication device 45 includes a beam control device 46 and a beamforming device 47. The communication device 45 is also referred to as a mission-system communication device. BF is an abbreviation of beamforming.

The edge server 42 is a server to communicate with the ground data center 90, and corresponds to an edge server of the ground data center 90. The edge server 42 includes a recording device 43. The edge server 42 may not include the recording device 43. The calculator 41 and the edge server 42 may be integrally configured.

Figure 3:
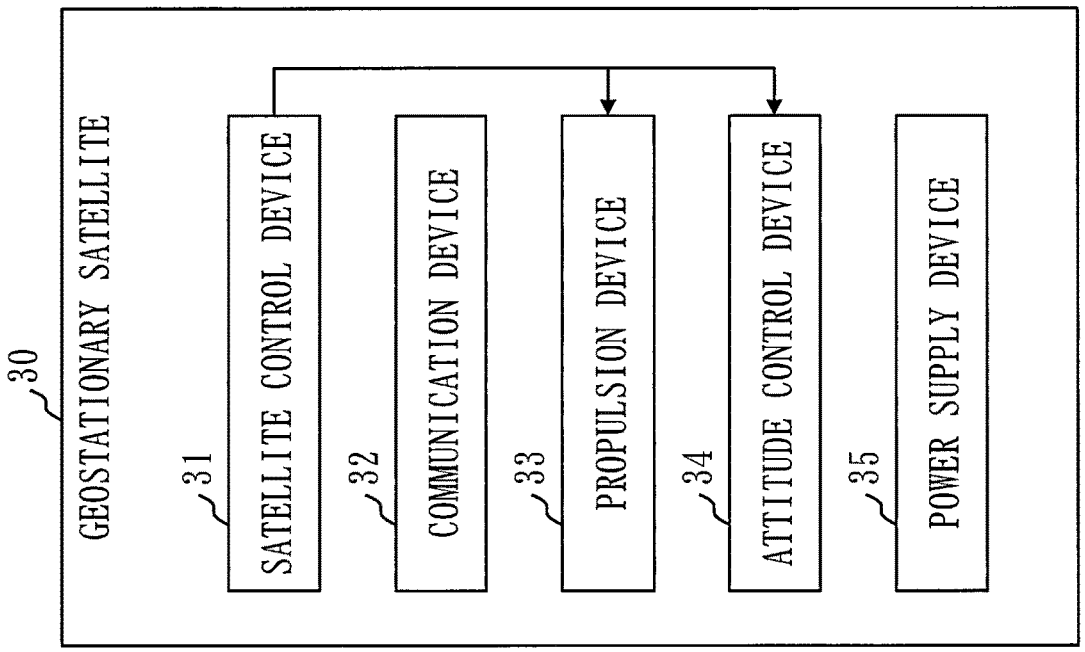
FIG. 3 is a diagram illustrating an example of hardware configuration of a geostationary satellite 30 according to Embodiment 1.

FIG. 3 illustrates an example of hardware configuration of the geostationary satellite 30. With reference to FIG. 3, the hardware configuration of the geostationary satellite 30 is described.

The geostationary satellite 30 includes a satellite control device 31, a communication device 32, a propulsion device 33, an attitude control device 34, and a power supply device 35. While the geostationary satellite 30 may include a component achieving other various functions, description is made in FIG. 3 on the satellite control device 31, the communication device 32, the propulsion device 33, the attitude control device 34, and the power supply device 35.

The satellite control device 31 is a computer to control the propulsion device 33 and the attitude control device 34 and includes a processing circuit. Specifically, the satellite control device 31 controls the propulsion device 33 and the attitude control device 34 in accordance with various commands transmitted from the ground system 50 and so forth.

The communication device 32 is a device to perform communication outside the geostationary satellite 30.

The propulsion device 33 is a device to give a propulsive force to the geostationary satellite 30 and changes the speed of the geostationary satellite 30.

The attitude control device 34 is a device to control attitude elements such as an attitude of the geostationary satellite 30, an angular speed of the geostationary satellite 30, and a line of sight. The attitude control device 34 changes the attitude elements in desired directions. Alternatively, the attitude control device 34 maintains the attitude elements in desired directions. The attitude control device 34 includes an attitude sensor, an actuator, and a controller. The attitude sensor is such a device as a gyroscope, an earth sensor, a sun sensor, a star tracker, a thruster, and a magnetic sensor. The actuator is such a device as an attitude control thruster, a momentum wheel, a reaction wheel, and a control moment gyro. The controller controls the actuator in accordance with measured data from the attitude sensor or various commands from the ground system 50 and so forth.

The power supply device 35 includes equipment such as a solar cell, a battery, and a power controller and supplies power to each equipment mounted in the geostationary satellite 30.

The processing circuit included in the satellite control device 31 is described. The processing circuit may be dedicated hardware or may be a processor to execute a program stored in a memory. In the processing circuit, some functions may be fulfilled by dedicated hardware and the remaining functions may be fulfilled by software or firmware. That is, the processing circuit may be implemented by hardware, software, firmware, or a combination of those. Specifically, the dedicated hardware is a single circuit, a composite circuit, a programmed processor, a parallelly programmed processor, an ASIC, an FPGA, or a combination of those. ASIC is an abbreviation of Application Specific Integrated Circuit. FPGA is an abbreviation of Field Programmable Gate Array.

Figure 4:
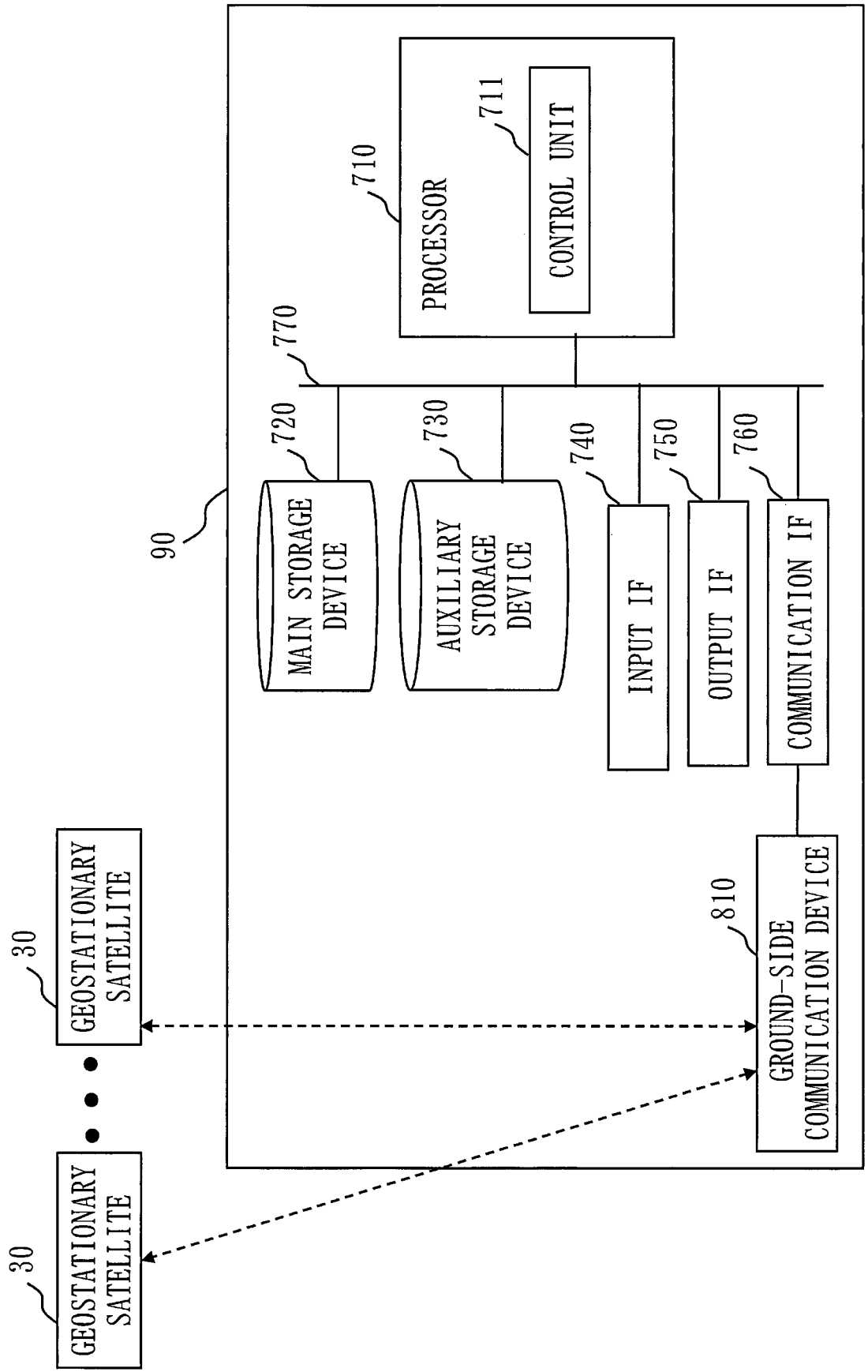
FIG. 4 is a diagram illustrating an example of hardware configuration of a ground data center 90 according to Embodiment 1.

FIG. 4 illustrates an example of hardware configuration of the ground data center 90. The ground data center 90 communicates with the geostationary satellites 30. The ground data center 90 is connected to a ground-side communication device 810, and the ground data center 90 communicates with the geostationary satellites 30 via the ground-side communication device 810. The ground data center 90 may include a mobile terminal.

Each configuration between the gateway 20 and each device included in the geostationary satellites 30 may be similar to the configuration of the ground data center 90.

The ground data center 90 includes a processor 710 and further includes other pieces of hardware such as a main storage device 720, an auxiliary storage device 730, an input interface 740, an output interface 750, and a communication interface 760. In FIG. 4, each interface is denoted as IF. The processor 710 is connected via a signal line 770 to other pieces of hardware to control the other pieces of hardware.

The ground data center 90 includes, as a functional element, a control unit 711. The functions of the control unit 711 are achieved by hardware or software. The control unit 711 performs processing by following an instruction from a satellite communication program.

Description of Operation

The operation procedure of the satellite communication system 1 corresponds to a satellite communication method. Also, a program achieving the operation of the satellite communication system 1 corresponds to a satellite communication program. The satellite communication program is a generic name of programs operating in each device included in the satellite communication system 1. The satellite communication program may be recorded on a computer-readable, non-volatile recording medium. The non-volatile recording medium is, as a specific example, an optical disk or flash memory. The satellite communication program may be provided as a program product.

Operation Example 1 According to Embodiment 1

Figure 5:
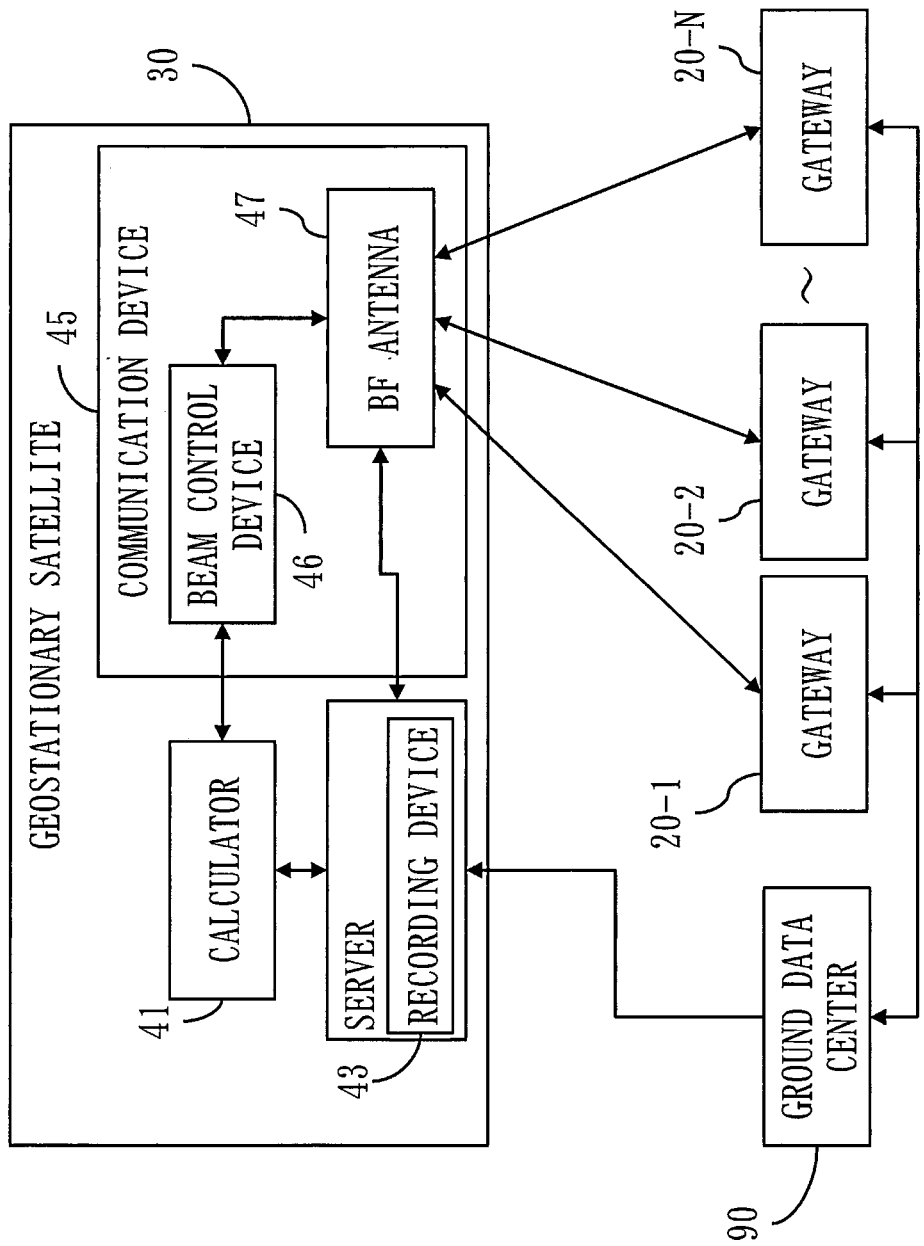
FIG. 5 is a diagram illustrating a configuration example of the satellite communication system 1 according to Embodiment 1.

FIG. 5 illustrates a configuration example of the satellite communication system 1 according to present operation example. In the present operation example, the recording device 43 records information indicating communication traffic between the communication device 45 and at least any of the plurality of gateways 20 disposed on the ground. The calculator 41 derives a variable parameter value for controlling the beamforming device 47 so that, when imbalances in communication traffic among the plurality of gateways 20 are present, the imbalances in the communication traffic among the plurality of gateways 20 decrease, and transmits information indicating the derived variable parameter value to the beam control device 46. Deriving the variable parameter value is finding a setting value of the variable parameter value. The beam control device 46 receives the information indicating the variable parameter value derived by the calculator 41 to control the beamforming device 47 based on the variable parameter value indicated by the received information. As a specific example, the beam control device 46 changes the frequency, the beam width, and the directivity direction of the beamforming device 47 based on the received variable parameter.

In recent years, to address an increase in speed and capacity of communication satellites and changes in user needs with a longer operation period in orbit, communication devices have been fully digitalized, and a technique for making flexible payload by using digital beamforming has advanced. Meanwhile, needs are increasing for high-speed broadband satellite communication systems by High Throughput Satellites (HTS) allowing large-capacity communication by using a beam control device with a wide-band channelizer.

An object of the present operation example is to autonomously, dynamically, and timely monitor and manage a communication device called a flexible payload in a situation in which communication traffic changes due to transfer at least part of resource management functions conventionally performed in the ground system 50 onto an orbit, thereby constructing a high-speed broadband satellite communication system on a space-basis. The communication device called a flexible payload has flexibility in frequency allocation and service coverage.

The flexible payload has been oriented to be fully digitalized in recent years, in which flexibility is ensured by changing frequency allocation and the beam width and the visual field direction by variable beam control with the use of a digital channelizer and digital beamforming. However, it is not required to limit the flexible payload to a digital device, and the satellite communication system 1 may be made inexpensive by a flexible payload obtained by combining a digital device and an analog device.

Changes in communication traffic are changes in transmitted and received data amounts. When the data amounts of the plurality of gateways 20 significantly vary, by expanding transmission capacity with means for increasing beam types so as to widen the frequency band directional to the gateway 20 with a large data amount, means for increasing the number of beams per unit service range, or the like, it is possible to level data rates.

As an example of achievement of a function in which the geostationary satellite 30 monitors communication traffic and manages resources of digital payloads of the communication device 45 based on the monitoring result, a specific example of optimization control by using an optimization algorithm is described. In the present example, first, the calculator 41 monitors changes in communication amount of each of the plurality of gateways 20 disposed on the ground. Next, based on the monitoring result, the calculator 41 flexibly controls digital beams so that resources such as electric power and communication capability of the geostationary satellites 30 are optimally distributed to level the data rates among the plurality of gateways 20. The optimization algorithm is, as a specific example, an algorithm for determining a variable parameter value for controlling the beamforming device 47.

Here, beamforming is a technique of transmitting radio waves, sound waves, or ultrasonic waves toward a specific direction or a technique of receiving them from a specific direction. Techniques that have been known as beamforming in a phased array antenna (APAA: Active Phased Array Antenna) include a technique of controlling the directivity direction and the beam width of a transmission beam by controlling transmission power for each of a plurality of transmission/reception modules and a technique of controlling transmission power for each of a plurality of transmission/reception modules. A beamforming device that performs beamforming with many arrayed feeds has also been known in recent years. As an amplifier in the beamforming device 47, a traveling wave tube amplifier (TWTA), a solid state power amplifier (SSPA), or the like is used.

As the beam control device 46, a channelizer for changing routing of a plurality of channels has been known. The channelizer selects, as a specific example, a plurality of frequency bands such as Ka-band or Ku-band, or performs frequency control called frequency hopping, in which the center frequency and the band for use are changed in the same frequency band. Also, the channelizer controls the beam width, the directivity direction, and electric power of the beamforming device.

Note that while resource management of a digital payload is performed in general communication resource management, the communication device 45 according to the present operation example may perform resource management of an analog payload or a semi-digital payload with analog and digital ones mixed together.

If the operation of communication resource management conventionally performed on the ground is performed at the geostationary satellite 30 as in the present operation example, one effect is that loads on the ground can be reduced. Also, according to the present operation example, by autonomously performing optimization management, adapted to time transitions of user needs, of communication traffic in outer space, it is possible to reduce loads of the ground system 50.

Operation Example 2 According to Embodiment 1

In the present operation example, an object is to reduce the exhaust heat amount in the ground system 50 by disposing the edge server 42 in the geostationary satellite 30 to make the geostationary satellite 30 into IoT (Internet of Things) and distributing part of the process of the ground system 50 to the IoT-made geostationary satellite 30.

Figure 6:
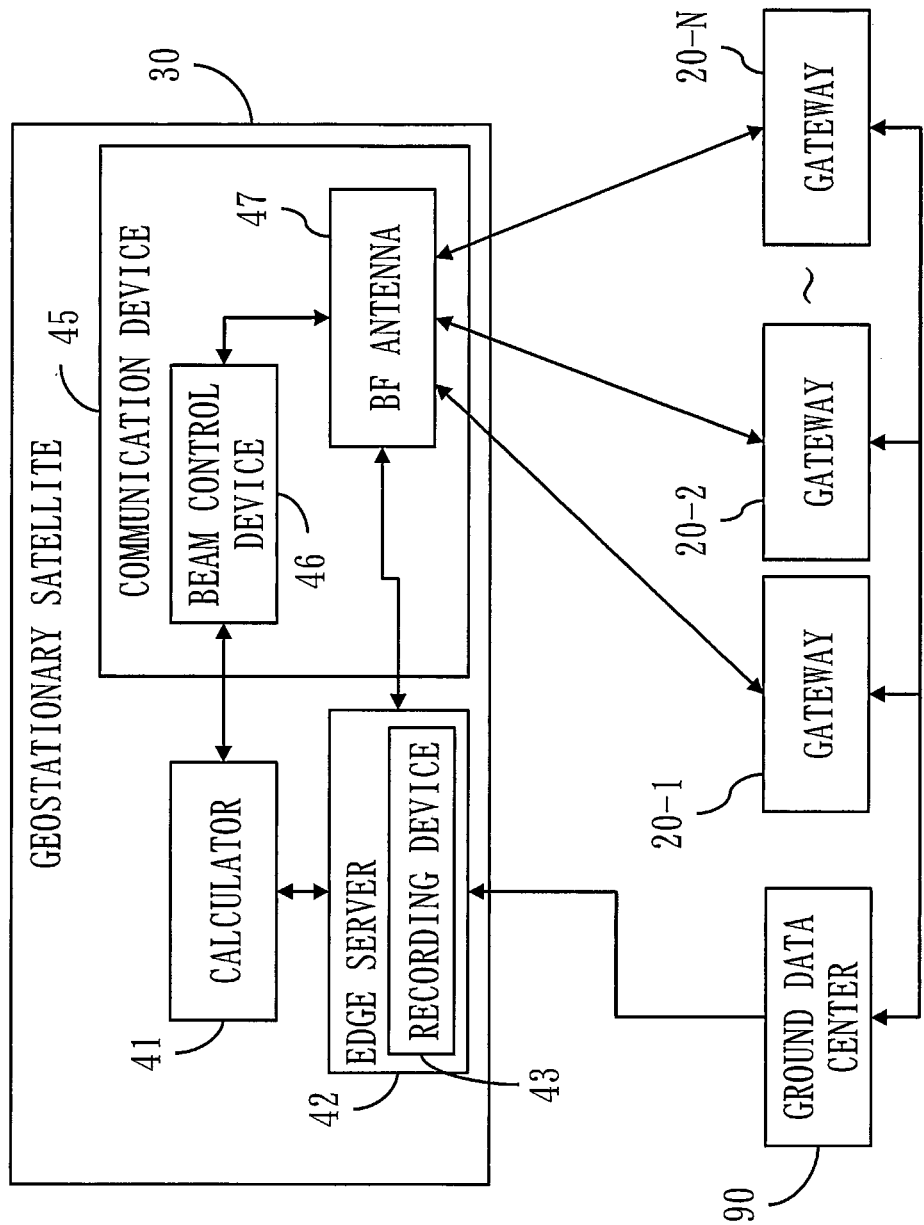
FIG. 6 is a diagram illustrating a configuration example of the satellite communication system 1 according to Embodiment 1.

FIG. 6 illustrates a configuration example of the satellite communication system 1 according to the present operation example. In the present operation example, the edge server 42 of the geostationary satellite 30 includes the recording device 43. The present operation example is similar to the operation example 1 according to Embodiment 1.

(Description of Cloud Computing)

With an increase in information amount together with sophistication of information society, measures against an increase in power consumption and exhaust heat have to be taken. In particular, in a centralized mechanism, measures against large electric power at supercomputers, large-scale data centers, or the like and exhaust heat have to be seriously taken.

On the other hand, in outer space, heat can be exhausted to deep space by radiational cooling. Thus, a system can be thought in which a supercomputer, data center, or the like for achieving a cloud environment are provided on an artificial satellite side and, after arithmetic process is performed in orbit, only necessary data is transferred to users on the ground. According to the system, one effect is that the cloud environment can be maintained and reduction in exhaust amount of greenhouse gas on the ground can contribute to SDGs (Sustainable Development Goals) on the ground.

With the edge server 42 mounted on the geostationary satellite 30 provided with at least part of the functions of a cloud data center conventionally set on the ground and with at least part of processing of the cloud data center being performed in orbit, one effect is that it is possible to contribute to a reduction in process loads on the ground.

According to the conventional technology, to set a variable parameter of a flexible payload, traffic monitoring is performed on the ground, and analysis process for optimization for decreasing imbalances among gateways and variable parameter setting are performed on the ground and transmitted to a satellite. According to the present operation example, processing conventionally performed on the ground is autonomously performed in outer space, and therefore process loads on the ground are reduced.

Also, according to the present operation example, one effect is that, when communication of large-capacity data is made between the ground data center 90 and the edge server 42 in geostationary orbit, by leveling data rates among the gateways 20, it is possible to make high-speed large-capacity communication via the plurality of gateways 20. Furthermore, by transmitting the information in the ground data center 90 included in the ground cloud environment to the edge server 42 in orbit, it is possible to share the information between the ground data center 90 and the edge server 42 or distribute the information to the ground data center 90 and the edge server 42.

Operation Example 3 According to Embodiment 1

The present operation example corresponds to an operation example obtained by expanding the operation example 1 or 2 according to Embodiment 1. The calculator 41 according to the present operation example derives a variable parameter value by using an inference model that have learned a relation between each communication traffic among the plurality of gateways 20 and variable parameter values. In the present operation example, the ground data center 90 includes a software model simulating the satellite communication system 1.

Since technology of machine learning such as deep learning by AI (Artificial Intelligence) has been progressing, with the calculator 41 having AI, the calculator 41 can achieve many functions. The calculator 41 having AI monitors communication traffic of the gateways 20 in orbit, and performs optimum control of a full-digital device in accordance with changes in the monitored communication traffic.

Meanwhile, studies have been advancing in recent years in which, with application of a modeling scheme called SDN (Software Defined Network) to ground assets in advance, a cloud business entity analyzes changes in user needs and, with application of a modeling scheme called VSN (Virtual Satellite Network) to satellite assets in advance, optimizes communication traffic on software in accordance with changes in user needs. A software model included in the ground data center 90 reflects the results of these studies.

By using the software model, a simulator included in the ground data center 90 analyzes changes in user needs, generates teacher data or a teacher model based on the analysis results, and uploads the generated teacher data or teacher model to the edge server 42. By using the uploaded teacher data or teacher model, the calculator 41 updates the optimization algorithm. Thus, the simulator can achieve both of an improvement in performance of AI of the calculator 41 and an improvement in machine learning effects.

An operation example of the satellite communication system 1 according to the present operation example is described.

First, the ground data center 90 analyzes variable parameters of the beamforming device 47 for decreasing imbalances in communication traffic among the plurality of gateways 20 by simulation using a software model.

Next, based on the result of analyzing the variable parameters, the ground data center 90 derives recommended parameter values, which are appropriate variable parameters in accordance with time transitions of user needs, and transmits, as teacher data, information indicating each of the derived recommended parameters and the result of analyzing the variable parameters to the edge server 42. The information indicating the result of analyzing the variable parameters is, as a specific example, information indicating imbalances in communication traffic among the plurality of gateways 20 or information indicating a feature of the imbalances, such as a time zone in which the imbalances occur.

Next, the calculator 41 receives, from the edge server 42, the information indicating each of the recommended parameters derived by the ground data center 90 and the result of analyzing the variable parameters, and uses the received information as teacher data to perform machine learning such as deep learning, thereby generating an inference model.

As a factor in changing communication traffic, needs for changing a beam control parameter on a real-time basis and on a large scale can be thought, such as, as a specific example, needs for highly-frequent parameter updates when a communication satellite is used in a disaster situation or the like. Also, as another factor, needs for yearly parameter updates can be thought to adapt to changes in user needs in a designed life period of a geostationary satellite over fifteen years or more.

Also, as variable parameters for controlling a flexible payload, there are parameters supporting a frequency domain, a space domain, a time domain, and the like. The parameters supporting the frequency domain are parameters supporting changes of a ratio of P-band, L-band, S-band, C-band, X-band, Ku-band, Ka-band, Q-band, or V-band, in accordance with changes in needs among frequency bands in which a communication business entity or the like has frequency interests. The parameters supporting the space domain are parameters supporting changes of a ground service area by changing the beam width and the visual field direction of many beams. The parameters supporting the time domain are parameters for various supports, such as real-time optimum control, adaptation to daily changes at day and night time, adaptation to seasonal changes, support for yearly changes, and so forth.

Also, when the communication target is a mobile body, it is required to ensure a service coverage in accordance with the movement range of the movable body and change the visual field of beams.

To handle these many variable parameters, it is rational that the calculator 41 includes artificial intelligence and the calculator 41 stores the parameter control result by previous communication resource management and the result of changes of the traffic monitor result with the parameter control result in the edge server 42 to update the optimization algorithm by machine learning.

Inputs to the inference model are information related to communication traffic of each of the plurality of gateways 20. The information is, as a specific example, information indicating imbalances in communication traffic among the plurality of gateways 20 or input information in user needs change analysis. The input information in user needs change analysis is described by using a specific example. When it is empirically grasped that user needs change in strong correlation with time transitions, it is rational for the inference model to derive a recommended parameter value, which is an appropriate variable parameter in accordance with time transitions of user needs. In another specific example, if an element in strong correlation with the number of users changes, such as changes in population or changes in population density area distribution, optimum values of the total communication amount and the beam directivity direction change. Thus, it is rational to derive a recommended parameter value, which is an appropriate variable parameter in accordance with changes of the element in strong correlation with the number of users. Also, as another specific example, if user needs change with changes in the communication environment, such as development of new technology or development of social infrastructure, it is rational to derive a recommended parameter value, which is an appropriate variable parameter in accordance with user needs with changes in the communication environment. Therefore, when generating an inference model, as information related to communication traffic of each of the plurality of gateways 20, the calculator 41 may use, as part of teacher data, input information in user needs change analysis, such as information indicating time transitions of user needs, information indicating changes of the element in strong correlation with the number of users, or information indicating changes in communication environment, in place of information indicating imbalances in communication traffic among the plurality of gateways 20. Thus, generated inference model corresponds to an inference model that has learned a relation between communication traffic among the plurality of gateways 20 and the variable parameter values.

Note that the ground data center 90 may generate an inference model.

Operation Example 4 According to Embodiment 1

The present operation example corresponds to an operation example obtained by expanding the operation example 1 or 2 according to Embodiment 1. In the present operation example, the ground data center 90 includes a software model simulating the satellite communication system 1.

An operation example of the satellite communication system 1 according to the present operation example is described.

First, the ground data center 90 analyzes a variable parameter for decreasing imbalances in communication traffic among the plurality of gateways 20 by simulation using a software model.

Next, based on the result of analyzing the variable parameter, the ground data center 90 generates an optimization algorithm for use in the calculator 41, and transmits information indicating the generated optimization algorithm to the edge server 42.

Next, the edge server 42 receives the information indicating the optimization algorithm, and transmits the received information indicating the optimization algorithm to the calculator 41.

Next, the calculator 41 receives the information indicating the optimization algorithm, and replaces the optimization algorithm recorded on the recording device of the calculator 41 with the received optimization algorithm.

Other Configurations

Modification 1

Figure 7:
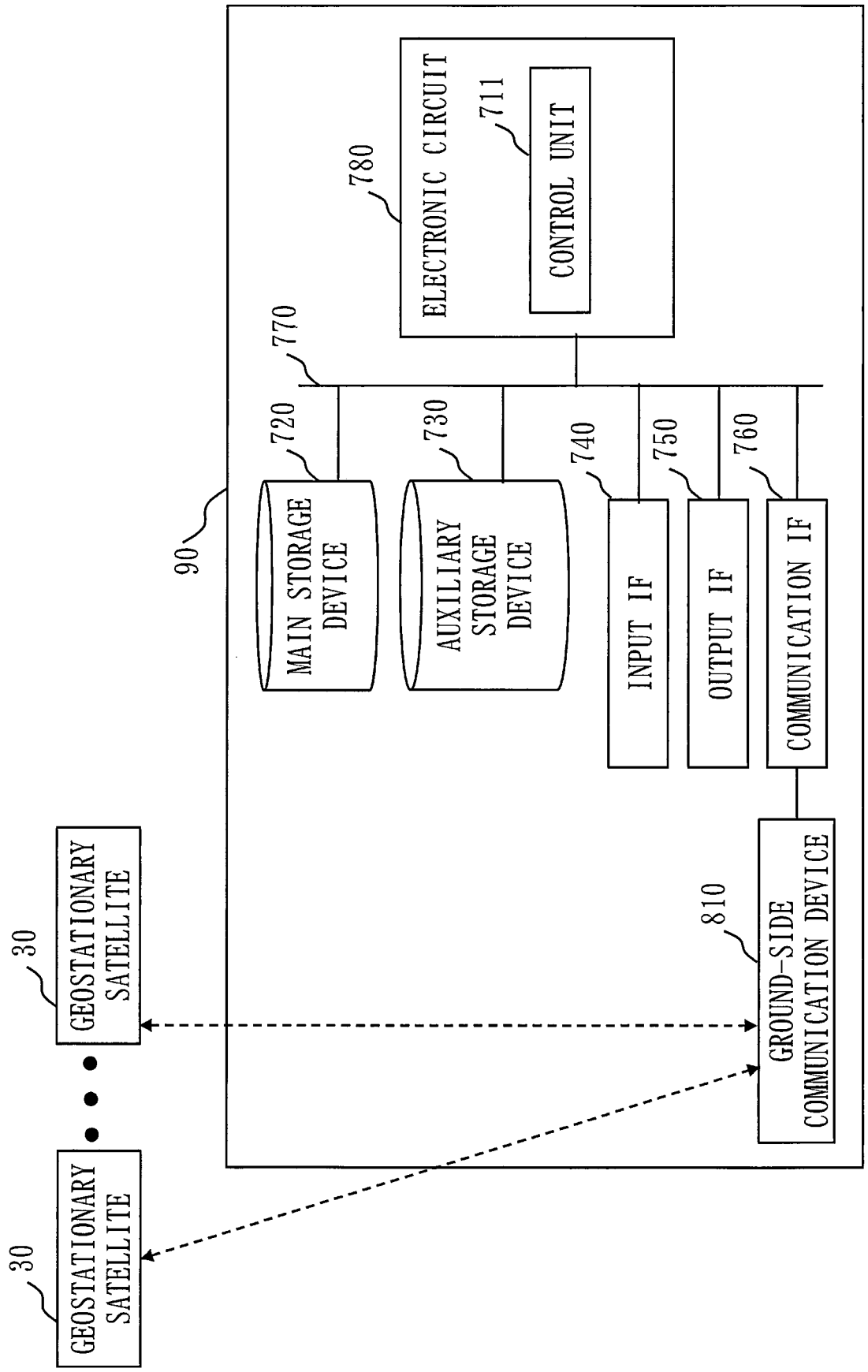
FIG. 7 is a diagram illustrating an example of hardware configuration of the ground data center 90 according to a modification of Embodiment 1.

In the present embodiment, the functions of the control unit 711 are implemented by software. As a modification, the functions of the control unit 711 may be implemented by hardware. FIG. 7 illustrates the present modification.

The ground data center 90 includes an electronic circuit 780 in place of the processor 710.

The electronic circuit 780 is a dedicated electronic circuit to achieve the functions of the control unit 711.

The electronic circuit 780 is specifically, a single circuit, a composite circuit, a programmed processor, a parallelly programmed processor, a logic IC (Integrated Circuit), a GA (Gate Array), an ASIC, or an FPGA.

The functions of the control unit 711 may be achieved by one electronic circuit or may be achieved by being distributed among a plurality of electronic circuits.

As another modification, part of the functions of the control unit 711 may be achieved by the electronic circuit 780 and the remaining functions may be achieved by software.

The processor 710, the electronic circuit 780, the main storage device 720, and the auxiliary storage device 730 may be collectively referred to as processing circuitry. That is, in the ground data center 90, the functions of the control unit 711 are achieved by the processing circuitry.

Embodiment 2

In the following, differences from the embodiment described above are mainly described with reference to the drawings.

A method of achieving each of on-demand content distribution and live video distribution by using a satellite communication line has been awaited. In the present embodiment, a method is suggested in which a geostationary satellite including an edge server and a replay relay device performs multicast distribution of contents to users making requests for content distribution to reduce ground communication traffic. Here, the edge server includes a database having stored therein data indicating content distribution requests collected by a low-earth-orbit broadband constellation. Also, in the present embodiment, a space data center is suggested in which a low-earth-orbit constellation collects data indicating distribution requests and a geostationary satellite performs multicasting of contents corresponding to the distribution requests by utilizing a replay relay device and beam control.

Satellite communication business is in a transition period with the advent of the full digital satellite. In the conventional satellite communication business, the main stream business model is that a broadcast business entity that have created contents based on advertisement incomes performs service of simultaneous broadcasting to a wide area by using a bent-pipe communication satellite. Meanwhile, in recent years, with the proliferation of internet on the ground, business models of earning incomes by billing from users by distributing on-demand contents have rapidly grown, and therefore communication traffic has increased. Thus, as measures for mitigating communication traffic on the ground, utilization of satellite communication using a full digital satellite has been increasingly expected.

However, under present circumstances, no on-demand content distribution method by satellite communication has been established, and therefore intrinsic merits of artificial satellites have not been effectively utilized.

While the geostationary satellite has strengths, such as capability of simultaneous broadcasting to a wide area, it has weaknesses, such as requiring a huge antenna to achieve bidirectional smartphone direct communication.

On the other hand, while a low-earth-orbit broadband constellation that has been rapidly developed in recent years is expected to achieve smartphone direct communication, it has an aspect that cannot be said to be good at simultaneously distributing contents with large capacity to a wide area. This is because transmitting the same content to an enormous number of users individually by the low-earth-orbit broadband constellation is irrational because intersatellite communications are required to be repeated an enormous number of times.

In the first place, a surge of communication traffic on the ground due to an increase of on-demand users is attributed to the aspect in which the low-earth-orbit broadband constellation is not good at simultaneous distribution to a wide area. Thus, simultaneous broadcasting by a geostationary satellite is thought to be effective as measures for mitigating communication traffic on the ground. As a specific example of mitigation of communication traffic on the ground, the geostationary satellite distributes data by simultaneously broadcasting to a plurality of edge servers arranged in a distributed manner, and each edge server caches the distributed data for distribution from each edge server to near-distance users.

Thus, in the present embodiment, a method of rationally achieving on-demand content distribution by satellite communication is provided.

As a specific example, first, the low-earth-orbit broadband constellation collects data indicating requests for distribution of ID (Identification)-equipped on-demand contents, and uploads the collected data to the geostationary satellite. Next, each user device that is present in a wide area downloads the data from the geostationary satellite. According to the present example, both merits can be effectively utilized.

If the ID-equipped digital contents are retained in the geostationary satellite as an edge server and the geostationary satellite performs replay and relay in response to a distribution request, it is possible to achieve on-demand content distribution by satellite communication.

When three or more geostationary satellites arranged in a distributed manner to a longitudinal direction on the equator perform bidirectional communication to form a circular communication network, it is possible to achieve on-demand content distribution service to the entire world. Also, in this case, according to a space data center concept by using a low-earth-orbit broadband constellation in combination, it is possible to perform live video distribution to the entire world.

Also, unlike the bent-pipe scheme that has been flourished as a broadcasting satellite, according to a flexible payload with high digitalization of mount devices, simultaneous distribution can be achieved by various methods. As a specific example, according to the above-described flexible payload, it is possible to distribute a different content for each area and perform rationalization such as increasing the transmission capacity to an area with highly-dense distribution requests. Furthermore, when various contents are widely distributed, if the transmission capacity is increased by extending a communication band, it is possible to achieve individual content distribution for a short time. Also, in this case, if various contents are distributed in a time-division manner, it is possible to resolve user's distribution waiting time to a level at which the user is less prone to feel stress. In this manner, according to multicast by the flexible payload, compared with the bent-pipe scheme, simultaneous distribution that is excellent in quality and quantity can be performed.

In on-demand content distribution, those who engage therein as stakeholders are: a content distribution business entity; a satellite operation business entity; a network business entity; a server business entity such as one with a cloud server, edge server, and so forth; and a low-earth-orbit satellite communication business entity. Here, the source of fund for operation of a system of the distribution is income by billing from users, and the operation of the system of the distribution is established based on a mutual contractual relation regarding a communication-line use fee and a server use fee. Thus, with each business entity including a communication-line-use monitor device and a server-use monitor device, it is possible to clarify grounds for calculation with regard to the giving and receiving of use fees of each business entity. In addition, each business entity can obtain information conducive to optimization of system operation, such as the number and arrangement of edge servers, and content updating frequency and retention period.

In recent years, aerospace use of AI has been expected. As a specific example, an AI calculator mounted on a satellite performs machine learning of conditions and algorithms conducive to optimization of operation of a communication system, and contents are optimally distributed by orbital beam control based on the result of machine learning. With this, a dramatic improvement in communication traffic on the ground can be expected.

In recent years, new business categories have been arising by joint ventures, teaming, or the like by a plurality of stakeholders.

As a specific example, if part or all of a satellite operation business entity, a server business entity, a network business entity, a low-earth-orbit broadband constellation business entity, and a content distribution business entity grapple a space data center business and practice a business of performing an on-demand content distribution method of performing automatic translation of spoken language included in on-demand distribution contents and distributing data including data indicating the result of automatic translation from the space data center, it is possible to distribute the on-demand contents to all users all over the world even those who are present in an area where development of digital communication infrastructure has been delayed. The on-demand distribution contents are, as a specific example, U.S. Hollywood movies, Korean dramas, or Japanese animation works.

As features of on-demand content distribution and live video distribution, regarding distribution requests, the required data amount is subtle and the number of distribution requests is enormous. Meanwhile, as the features, regarding distribution of contents corresponding to distribution requests, the data amount per content is large and the same data is transmitted to an enormous number of users. Furthermore, another feature is that while requests and distribution have a bidirectional relation, content distribution has a unidirectional property.

Therefore, it is thought to be rational that the low-earth-orbit broadband constellation assumes a role of uplink corresponding to distribution requests and the geostationary satellite, which is good at multicasting, assumes a role of downlink corresponding to distribution.

In general, in satellite communication by using a geostationary satellite, delay time is taken as a demerit. However, since on-demand content distribution and live video distribution both have a unidirectional property, delay time on the order of several seconds does not pose a problem.

As an effective method of billing for simultaneously-broadcast contents, as a specific example, there are a method of encrypting data indicating ID-equipped contents and allowing only users who have paid a bill and obtained an encryption key to decrypt the encrypted data and the conventional method of managing passwords by linking to user IDs of billed users in a membership system.

In recent years, in communication satellite pricing, since it is required to meet cost competition with ground communication infrastructure, price destruction has been progressing. This is a premise when the internet line is simply via aerospace, and is a price determination method when distribution of a content with a large data amount is performed for each user to perform distribution an enormous number of times.

However, when attention is brought to indexes of the worth of communication in consideration of efficiency of collecting communication line use fees, which are fees obtained by multiplying the billing amount by the number of users billed for a content distributed in simultaneous broadcasting at one time, on-demand distribution by a satellite has the worth of communication several digits higher than on-demand distribution by using a ground communication line. Here, the users include users who are present in an area where ground infrastructure has not been sufficiently developed.

Therefore, if on-demand distribution utilizing a space data center is brought into actual use, enormous wasteful tasks conventionally occurring in the ground communication line can be eliminated. The wasteful tasks are, as a specific example, transmission of the same content and repeated transmission between points far away from each other. Thus, if the above-described on-demand distribution is brought into actual use, the total communication amount is significantly decreased, collecting ground-communication-line use fees becomes difficult, and competitiveness of ground communication business entities is thought to be relatively decreased.

Note that it goes without saying that bringing on-demand distribution into actual use by the space data center leads to a paradigm shift to a desirable direction in view of SDGs, such as reduction of energy loss. Also, in this viewpoint, even if cost required to development seems high at a glance, the space data center is thought to have a reason for existence.

Note that when the term "replay relay device" is used in a ground portable base station, a distinction among the generations of mobile communication systems may be made. When a distinction among the generations of mobile communication systems is made, the ground portable base station is, as a specific example, eNB (evolved NodeB), which is a 4G (Generation) base station, or gNB (next Generation NodeB), which is a 5G base station.

In the present application, when the term "replay relay device" is used, it is not intended to make a distinction among the generations of mobile communication systems, and the replay relay device may be read as a "content replay device".

Description of Operation

Operation Example 1 According to Embodiment 2

Each process to be performed in the satellite communication system 1 according to the present operation example corresponds to each process configuring an on-demand content distribution method.

Figure 8:
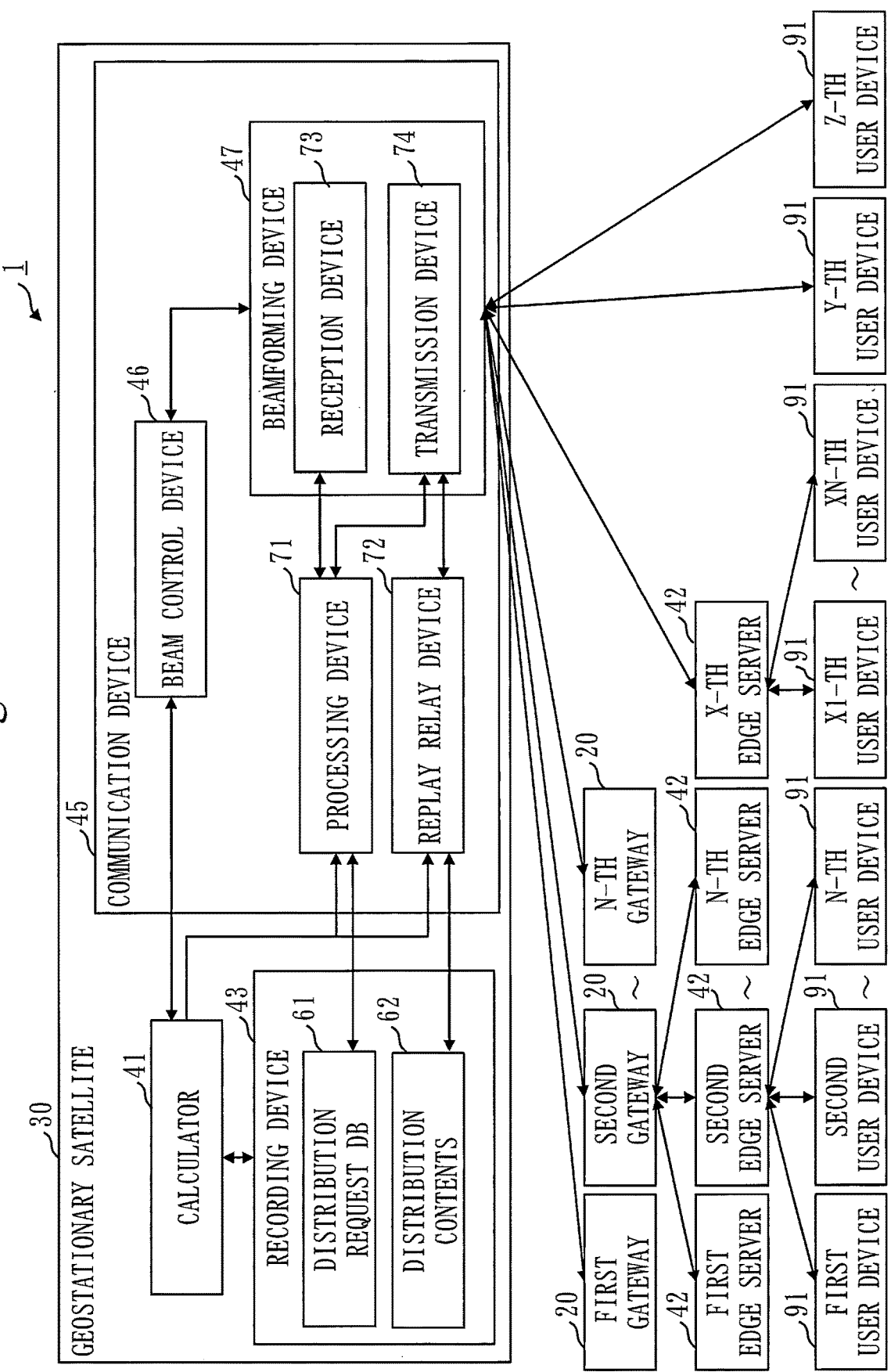
FIG. 8 is a diagram illustrating a configuration example of the satellite communication system 1 according to Embodiment 2.

FIG. 8 illustrates a specific example of the satellite communication system 1 according to the present operation example.

An artificial satellite according to the present operation example directly or indirectly communicates with each upload device configuring an upload device group. The artificial satellite is, as a specific example, the geostationary satellite 30. The upload device group is configured of at least one upload device that is present on the ground. Each upload device configuring the upload device group is any of the edge server 42 and the user device 91. When indirectly communicating with a target upload device, which is any upload device configuring the upload device group, the artificial satellite communicates with the target upload device via the gateway 20. The artificial satellite includes the recording device 43, the calculator 41, and the communication device 45, and is, as a specific example, the geostationary satellite 30.

The recording device 43 has stored therein a distribution request DB (Database) 61, which is a database obtained by making data indicating distribution requests for identifier-equipped contents into database form. The recording device 43 has stored therein data indicating an identifier-equipped content uploaded by at least any upload device configuring the upload device group to the recording device 43 via the communication device 45. The above-described data is, as a specific example, distribution contents 62. Also, the recording device 43 has stored, in the distribution request DB 61, data indicating a distribution request for the identifier-equipped content uploaded by at least any upload device configuring the upload device group to the recording device 43 via the communication device 45.

The distribution request DB 61 is formed of data indicating distribution requests, and is referred to also as an ID-equipped distribution content distribution request DB. ID is synonymous with an identifier.

The distribution contents 62 are data indicating distribution contents, and is referred to also as an ID-equipped distribution contents.

The calculator 41 selects the upload device having uploaded the data indicating a target distribution request, which is a distribution request included in the distribution request DB 61, to the recording device 43 as a selected upload device. The calculator 41 provides the communication device 45 with a distribution instruction for distributing data indicating an identifier-equipped content corresponding to the target distribution request via a replay relay device 72.

The communication device 45 includes a reception device 73, a transmission device 74, a processing device 71, and the replay relay device 72.

The reception device 73 receives the data indicating the identifier-equipped content uploaded by at least any upload device configuring the upload device group. The reception device 73 receives data from at least any of the gateway 20, the edge server 42, and the user device 91.

The processing device 71 has a function of processing data. The processing device 71 converts the data received by the reception device 73 into data in storable form in the recording device 43 and causes the converted data to be stored in the recording device 43. The converted data is, as a specific example, the distribution contents 62.

The replay relay device 72 modulates, based on the distribution instruction, the data indicating the identifier-equipped content stored in the recording device 43 into a transmission signal. The replay relay device 72 may be a general replay relay device.

The transmission device 74 transmits, to the selected upload device, the transmission signal obtained by modulation by the replay relay device 72 as the identifier-equipped content corresponding to the target distribution request.

Each of the calculator 41, the edge server 42, and the recording device 43 may be a general computer.

In recent years, demands for digital content on-demand distribution have been rapidly increasing. Thus, in a scheme of temporarily storing a content in a cloud server disposed on the ground or each of edge servers 42 arranged in a distributed manner on the ground and distributing the content to a plurality of users with destination designated in advance, communication traffic on the ground has been increasing.

Note that temporary storage of a content with a high degree of use frequency is referred to as caching, and distribution to a plurality of users with destinations designated in advance is referred to as multicast.

As measures for improving the communication environment on the ground, a system of performing digital content on-demand distribution by satellite communication with the use of artificial satellite's broadness has been awaited.

In the present operation example, an ID-equipped distribution content is cached in the recording device 43 included in the artificial satellite and, in response to content distribution requests, multicast is performed to a plurality of users.

As an on-demand content distribution method, there are a method of directly multicasting an ID-equipped content stored in the recording device 43 included in the artificial satellite to users and a method of caching a content from the artificial satellite to the edge server 42 and multicasting to users by the edge server 42.

In recent years, since the communication device of the artificial satellite has been fully digitalized, the artificial satellite can perform each of communication via the gateway 20 and direct communication with the edge server 42 or the user device 91. Thus, the edge server 42 may transmit data indicating an ID-equipped content to the artificial satellite via the gateway 20 and the edge server 42 or the user device 91 may directly transmit data indicating an ID-equipped content to the artificial satellite.

Similarly, the user device 91 may directly transmit data indicating a request for distributing an ID-equipped content to the artificial satellite and the edge server 42 may collect data indicating distribution requests and upload the collected data to the artificial satellite.

The replay relay device 72 edits data indicating an ID-equipped content temporarily stored in the recording device 43 into a transmission data form. The transmission device 74 multicasts the data edited by the replay relay device 72 to a distribution destination designated by the calculator 41.

Note that each of the edge server 42 and the user device 91 may be present on the ground or present in space.

The recording device 43 included in the artificial satellite may be referred to as the edge server 42.

Operation Example 2 According to Embodiment 2

The present operation example corresponds to an operation example obtained by expanding the operation example 1 according to Embodiment 2, and corresponds to an example of an on-demand content distribution method.

In the present operation example, a target edge server, which is the edge server 42 configuring the upload device group, collects data indicating a distribution request from at least one user device 91 configuring the upload device group, and directly or indirectly uploads the collected data to the recording device 43 included in the artificial satellite described in the operation example 1 according to Embodiment 2.

The artificial satellite according to the present operation example distributes an identifier-equipped content corresponding to the data indicating the distribution request uploaded to the recording device 43.

Figure 9:
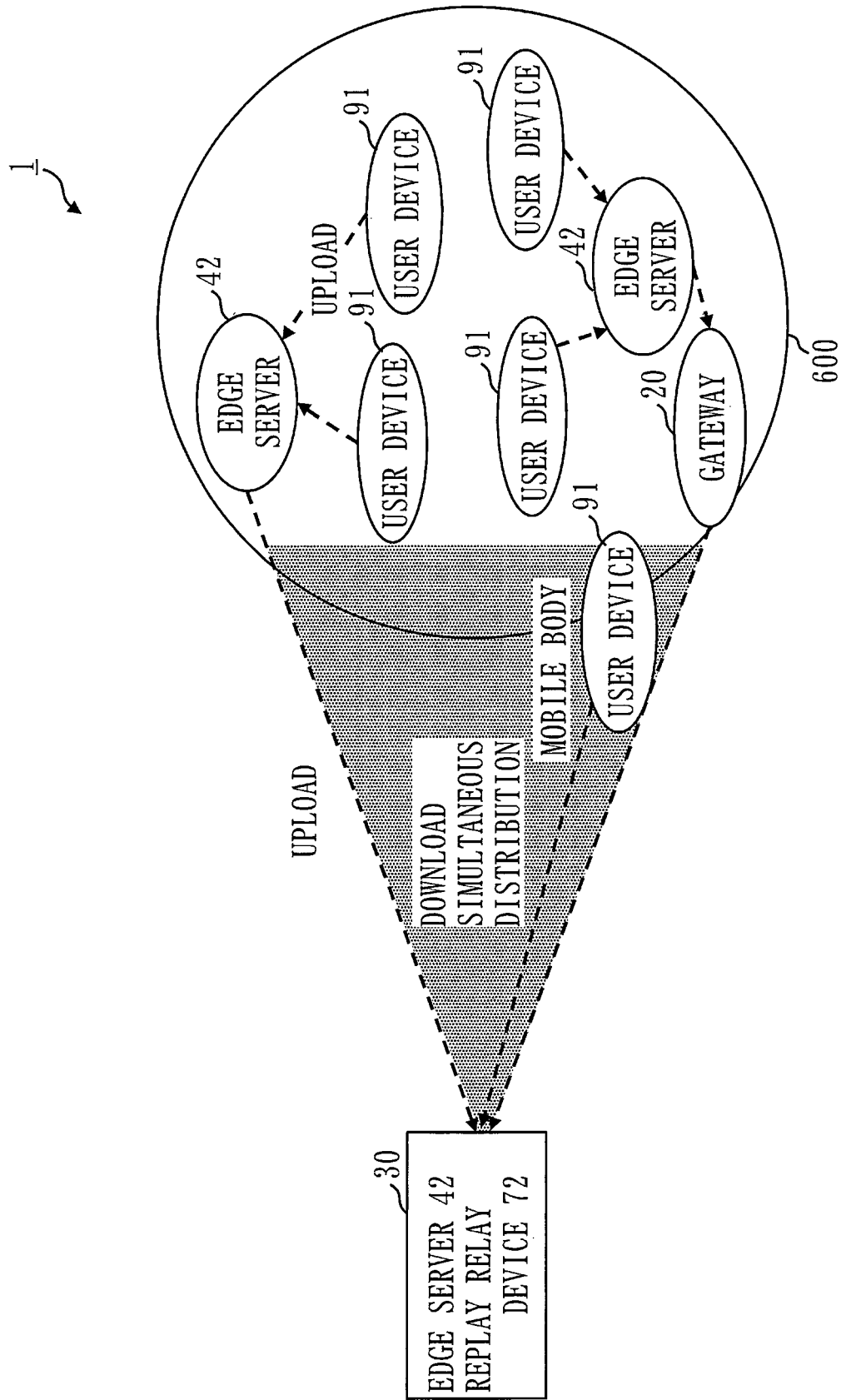
FIG. 9 is a diagram for describing the satellite communication system 1 according to Embodiment 2.

FIG. 9 is a diagram for describing the satellite communication system 1 according to the present operation example. As illustrated in FIG. 9, the present operation example is a method of collecting data indicating an ID-equipped content distribution request by the edge server 42 not via a low-earth-orbit broadband constellation and uploading the data collected by the edge server 42 to an artificial satellite.

Operation Example 3 According to Embodiment 2

The present operation example corresponds to an operation example obtained by expanding the operation example 1 according to Embodiment 2, and corresponds to an example of an on-demand content distribution method.

In the present operation example, a target edge server 42, which is the edge server 42 configuring an upload device group, receives low-earth-orbit satellite collection data from a low-earth-orbit broadband constellation, and directly or indirectly uploads the received low-earth-orbit satellite collection data to the recording device 43 included in the artificial satellite described in the operation example 1 according to Embodiment 2. The low-earth-orbit satellite collection data is data indicating a distribution request collected by the low-earth-orbit broadband constellation from at least one user device 91 configuring the upload device group.

The artificial satellite according to the present operation example distributes an identifier-equipped content corresponding to the data indicating the distribution request uploaded to the recording device 43.

Figure 10:
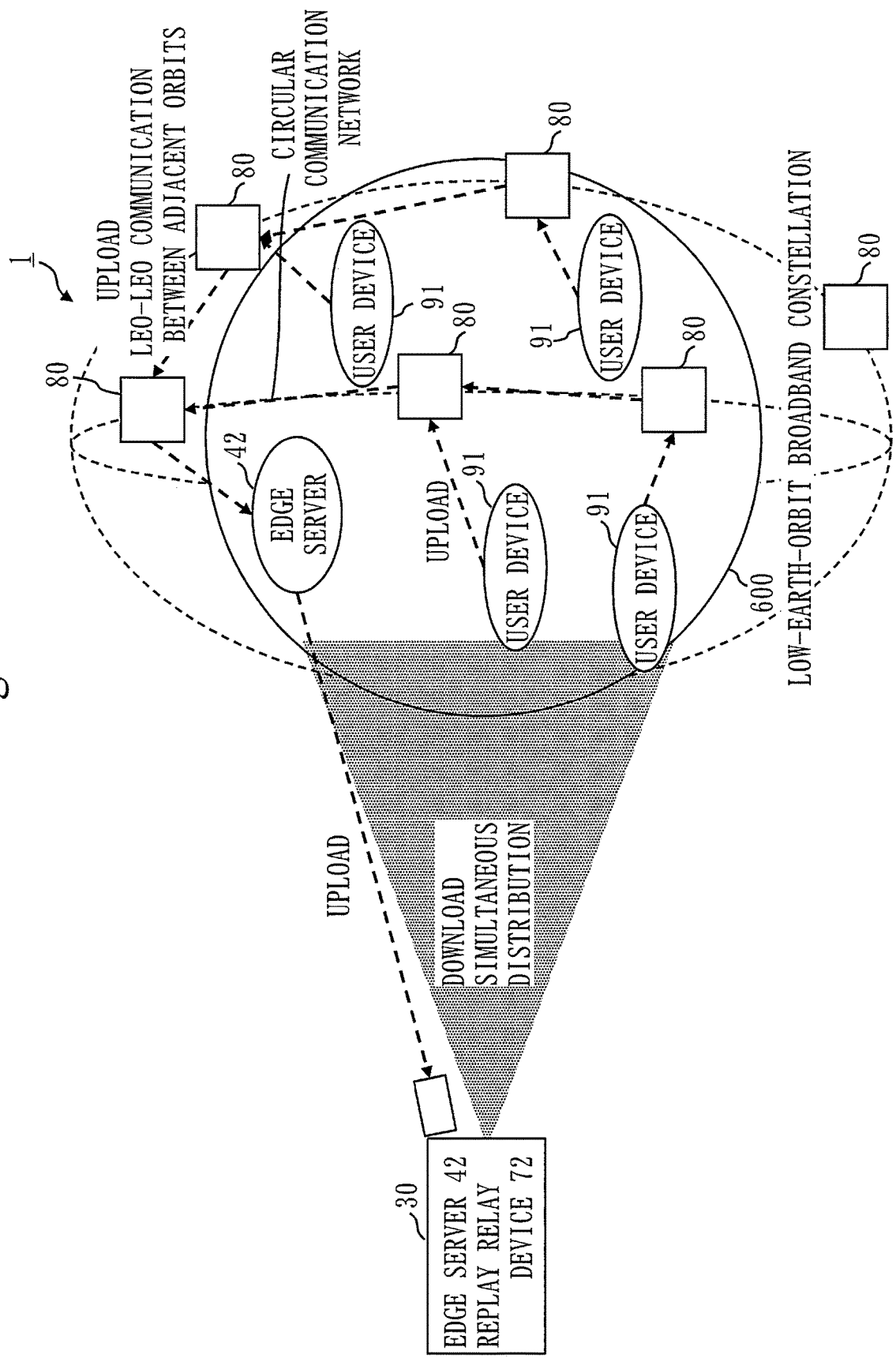
FIG. 10 is a diagram for describing the satellite communication system 1 according to Embodiment 2.

FIG. 10 is a diagram for describing the satellite communication system 1 according to the present operation example. As illustrated in FIG. 10, an on-demand content distribution method according to the present operation example is a method of collecting data indicating a distribution request for an ID-equipped content by using a low-earth-orbit broadband constellation and uploading the collected data to the geostationary satellite 30. Also, the method is a method in which, when the artificial satellite described in the operation example 1 according to Embodiment 2 and a low-earth-orbit satellite 80 configuring the low-earth-orbit broadband constellation both do not have a GEO-LEO (Geostationary Orbit-Low Earth Orbit) communication device, data indicating a distribution request is uploaded to the geostationary satellite 30 via the edge server 42 installed on the ground.

Note that the low-earth-orbit satellite 80 may also function as the edge server 42 that collects data indicating a distribution request. Also, the edge server 42 according to the present operation example may collect data indicating a distribution request transmitted from a user by smartphone direct communication.

Since the low-earth-orbit broadband constellation being currently developed, such as Starlink (registered trademark), includes a communication device to communicate with the ground and a LEO-LEO (Low Earth Orbit-Low Earth Orbit) communication device, it is possible to collect data indicating a distribution request for an ID-equipped content from a user who is present on the ground. However, since the low-earth-orbit broadband constellation does not include a GEO-LEO communication device, data uploading to the artificial satellite described in the operation example 1 according to Embodiment 2 is performed via the edge server 42 installed on the ground.

Operation Example 4 According to Embodiment 2

The present operation example corresponds to an operation example obtained by expanding the operation example 1 according to Embodiment 2, and corresponds to an example of an on-demand content distribution method.

In the present operation example, the artificial satellite described in the operation example 1 according to Embodiment 2 is the geostationary satellite 30, and includes a GEO-LEO communication device. The GEO-LEO communication device performs communication between the geostationary satellite 30 and the low-earth-orbit satellite 80. At least one low-earth-orbit satellite 80 configuring a low-earth-orbit broadband constellation includes a GEO-LEO communication device. The artificial satellite and the low-earth-orbit broadband constellation are communicably connected to each other via a GEO-LEO communication line. The GEO-LEO communication line is a communication line between the geostationary satellite 30 and the low-earth-orbit satellite 80. The low-earth-orbit broadband constellation collects data indicating a distribution request from at least one user device 91 configuring an upload device group, and uploads the collected data via the GEO-LEO communication line to the recording device 43 included in the artificial satellite. The artificial satellite distributes an identifier-equipped content corresponding to the data indicating the distribution request uploaded to the recording device 43.

The hardware configuration of the low-earth-orbit satellite 80 is similar to the hardware configuration of the geostationary satellite 30.

Figure 11:
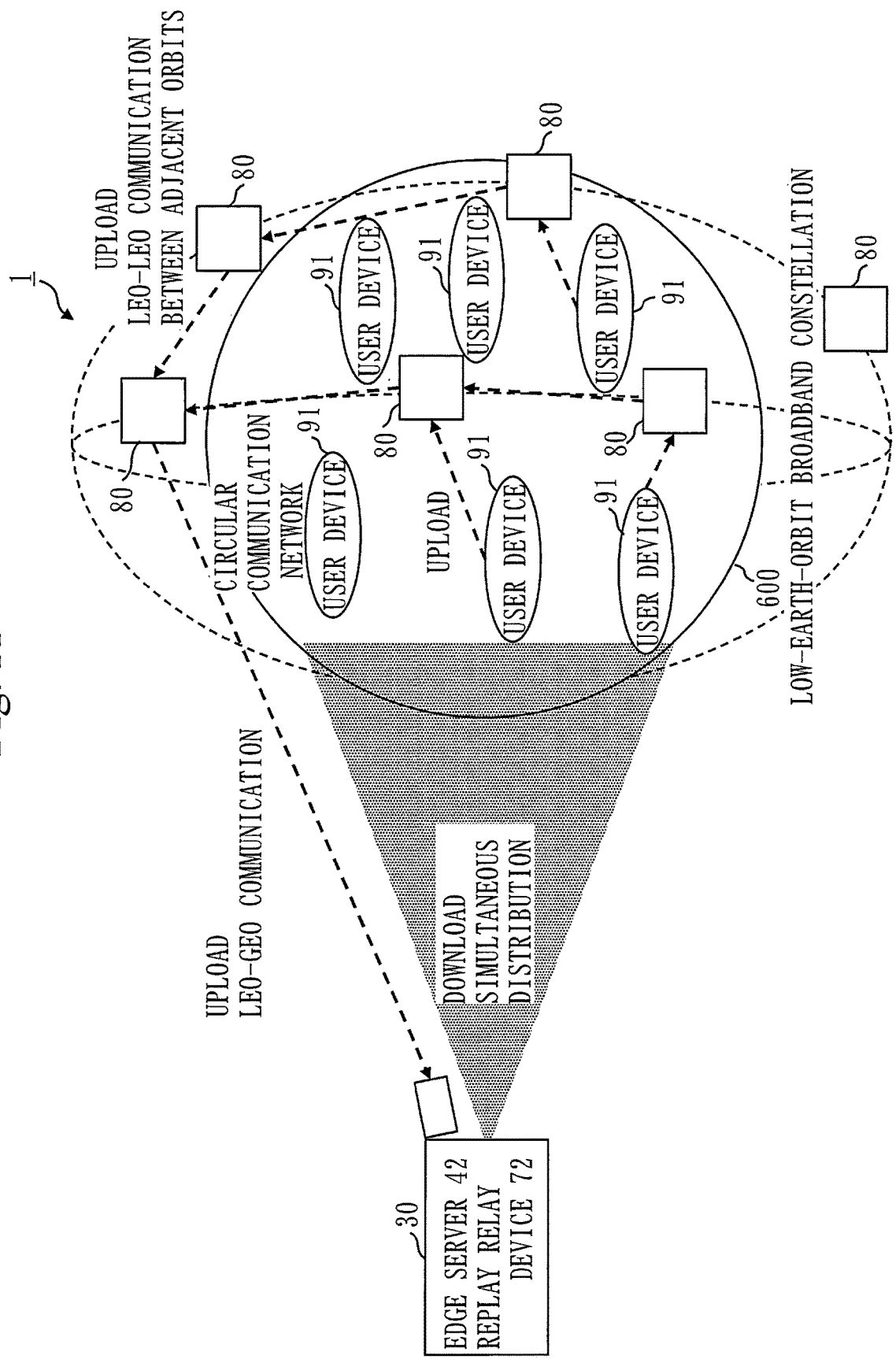
FIG. 11 is a diagram for describing the satellite communication system 1 according to Embodiment 2.

FIG. 11 is a diagram for describing the satellite communication system 1 according to the present operation example. As illustrated in FIG. 11, when the artificial satellite described in the operation example 1 according to Embodiment 2 and the low-earth-orbit satellite 80 each have a GEO-LEO communication device, the low-earth-orbit satellite 80 can directly upload the data indicating the distribution request collected by the low-earth-orbit satellite 80 to the artificial satellite.

Note that the low-earth-orbit satellite 80 may also function as the edge server 42 that collects data indicating a distribution request. Also, the edge server 42 may collect data indicating a distribution request transmitted from a user by smartphone direct communication.

Operation Example 5 According to Embodiment 2

The present operation example corresponds to an operation example obtained by expanding the operation example 4 according to Embodiment 2.

In the present operation example, a space data center is formed of a geostationary satellite group and a low-earth-orbit broadband constellation. The geostationary satellite group is configured of three or more artificial satellites described in the operation example 1 according to Embodiment 2 arranged in a distributed manner to a longitudinal direction. The recording device 43 included in each artificial satellite configuring the geostationary satellite group is the edge server 42. Each artificial satellite configuring the geostationary satellite group is the geostationary satellite 30, and includes a GEO-GEO communication device that performs bidirectional communication between artificial satellites that are adjacent to each other over the equator. Three or more artificial satellites configuring the geostationary satellite group form a circular communication network over the equator. At least one artificial satellite configuring the geostationary satellite group includes a GEO-LEO communication device that performs communication between the geostationary satellite 30 and the low-earth-orbit satellite 80. At least one low-earth-orbit satellite 80 configuring the low-earth-orbit broadband constellation includes a GEO-LEO communication device. The geostationary satellite group and the low-earth-orbit broadband constellation communicate with each other by using the GEO-LEO communication devices. The low-earth-orbit broadband constellation collects data indicating a distribution request from at least one user device 91 configuring an upload device group, and uploads the collected data to the recording device 43 included in the artificial satellite configuring the geostationary satellite group. The geostationary satellite group and the low-earth-orbit broadband constellation perform the on-demand content distribution method described in the operation example 4 according to Embodiment 2.

When the artificial satellite functions as the edge server 42, to achieve digital content on-demand distribution to users all over the world, it is rational to directly distribute a digital content cached in the edge server 42 to users via a satellite communication line.

Figure 12:
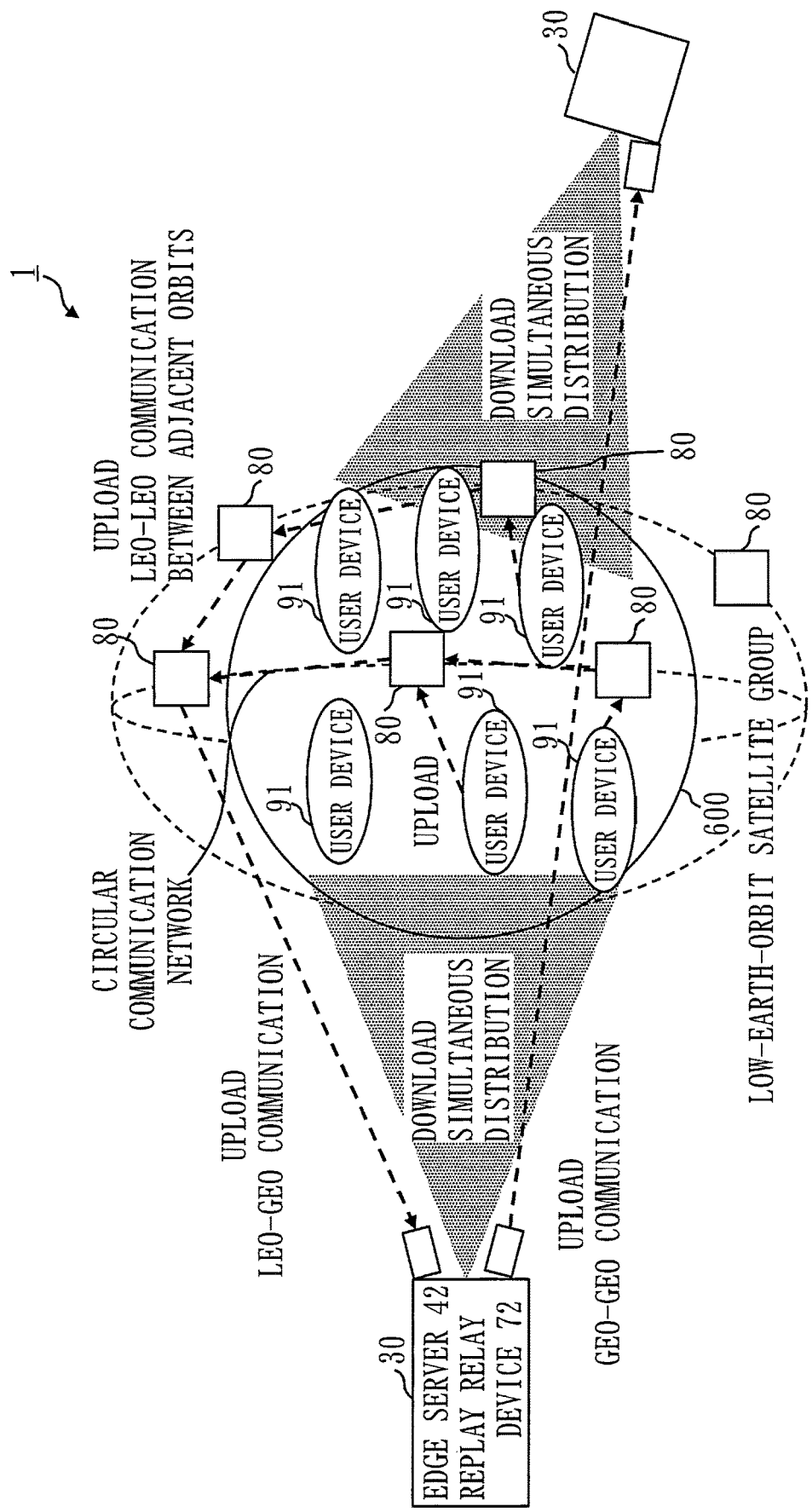
FIG. 12 is a diagram for describing the satellite communication system 1 according to Embodiment 2.

FIG. 12 is a diagram for describing the satellite communication system 1 according to the present operation example. As illustrated in FIG. 12, if three or more artificial satellites perform bidirectional communication in a geostationary orbit to form a circular communication network over the equator and the geostationary satellite group establishes communication with the low-earth-orbit broadband constellation forming a communication network with the user devices 91 that are present all over the world, a communication network to users all over the world can be formed from the edge server 42 in the geostationary orbit. Thus, according to the present operation example, one effect is that it is possible to achieve digital content on-demand distribution to users all over the world.

Figure 13:
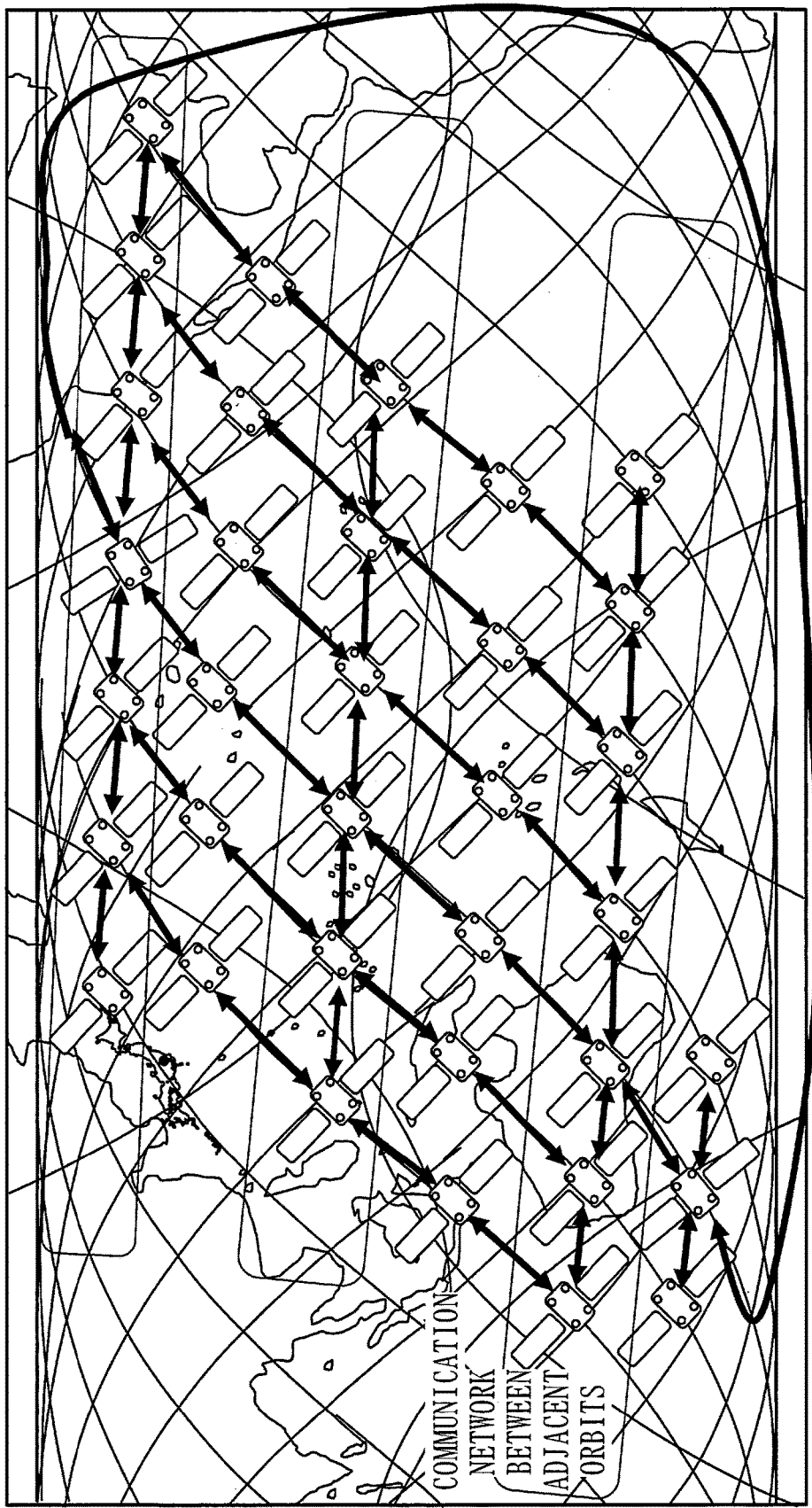
FIG. 13 is a diagram for describing a mesh communication network according to Embodiment 2.

FIG. 13 is a diagram for describing a low-earth-orbit broadband constellation according to the present operation example. As illustrated in FIG. 13, in the low-earth-orbit broadband constellation, a circular communication network and a mesh communication network are formed. Specifically, the low-earth-orbit broadband constellation has a plurality of orbit planes, and each low-earth-orbit satellite 80 communicates with each of the low-earth-orbit satellites 80 flying at front and rear on each orbit plane. Also, a target orbital satellite communicates with an adjacent orbital satellite. The target orbital satellite is the low-earth-orbit satellite 80 flying on a target orbit plane, which is any of the plurality of orbit planes. The adjacent orbital satellite is the low-earth-orbit satellite 80 flying on an orbit plane adjacent to the target orbit plane.

The worldwide proliferation of internet and an increase of demands for digital content distribution have posed a problem of an increase and concentration in communication traffic. Under present circumstances, it can be thought that, by using the edge server 42 or the like to advance distribution to make load mitigating measures progress, it is possible to further cultivate users and demands will further increase. To rationally solve this problem, it is rational to widely and hierarchically configure the edge servers 42 for content distribution requests. To address this, a space data center concept is effective, in which an artificial satellite including the edge server 42 is placed at an upper level of the hierarchical structure to construct a communication network with the user devices 91 that are present all over the world. Here, the above-described communication network includes a low-earth-orbit broadband constellation.

With the space data center including the replay relay device 72 and making distribution to users via the ground edge server 42 at a lower level of the hierarchical structure for a content distribution request, the communication network can be operated, with distributed loads in communication traffic. Here, it is rational to upload data indicating a content of a live distribution business entity to the space data center and make real-time distribution of the uploaded data to the entire world. Also, to address an increase in data capacity due to high definition of video contents, it is rational to use flexibility of a digital payload mounted on the artificial satellite to perform optimum control of a communication spot beam in accordance with needs.

Operation Example 6 According to Embodiment 2

The present operation example corresponds to an operation example obtained by expanding the operation example 4 according to Embodiment 2.

In the present operation example, as with the operation example 5 according to Embodiment 2, the space data center is formed of a geostationary satellite group and a low-earth-orbit broadband constellation. Each artificial satellite configuring the geostationary satellite group is the geostationary satellite 30, and includes a GEO-GEO communication device. The geostationary satellite group forms a circular communication network over the equator. In the low-earth-orbit broadband constellation, a plurality of orbit planes are arranged in a distributed manner to a longitudinal direction. Each low-earth-orbit satellite 80 orbiting in a low-earth orbit on each orbit plane of the plurality of orbit planes performs bidirectional communication with each of the low-earth-orbit satellites 80 flying at front and rear of each low-earth-orbit satellite 80 to form a circular communication network, and each orbit plane of the plurality of orbit planes performs interorbital communication with another orbit plane, thereby forming a mesh communication network in the low-earth-orbit broadband constellation. At least one artificial satellite configuring the geostationary satellite group includes a GEO-LEO communication device. At least one low-earth-orbit satellite 80 configuring the low-earth-orbit broadband constellation includes a GEO-LEO communication device. The geostationary satellite group and the low-earth-orbit broadband constellation perform bidirectional communication by using the GEO-LEO communication devices. At least one low-earth-orbit satellite 80 configuring the low-earth-orbit broadband constellation includes the edge server 42. The low-earth-orbit broadband constellation collects data indicating a distribution request from at least one user device 91 configuring an upload device group, and uploads the collected data to the recording device 43 included in the artificial satellite configuring the geostationary satellite group. The artificial satellite and the low-earth-orbit broadband constellation perform the on-demand content distribution method described in the operation example 4 according to Embodiment 2.

Figure 14:
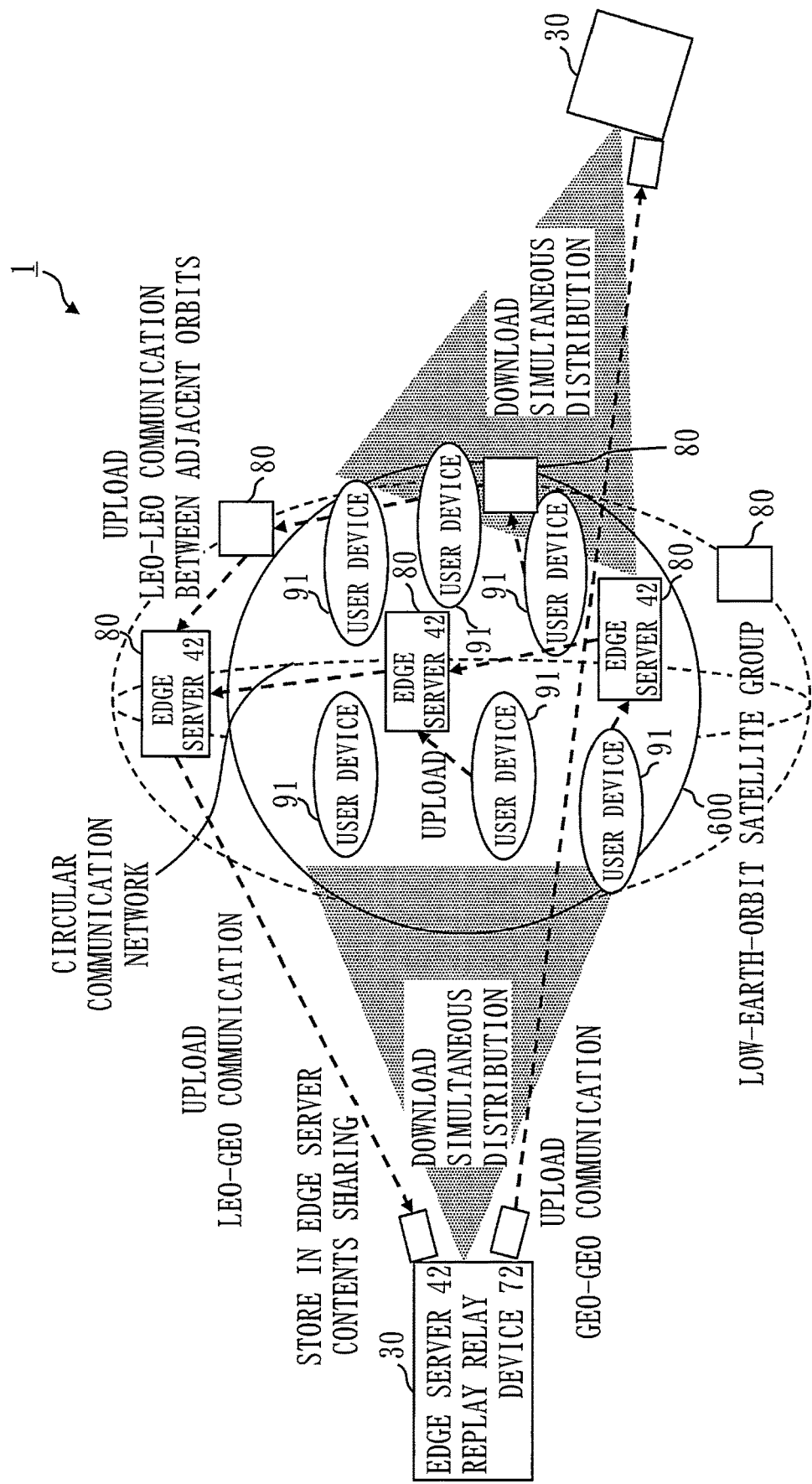
FIG. 14 is a diagram for describing the satellite communication system 1 according to Embodiment 2.

When communication traffic of the geostationary satellite 30 increases, it is effective to mitigate communication traffic of the geostationary satellite 30 by arranging the edge servers 42 in a distributed manner in an orbit. Each low-earth-orbit satellite 80 configuring a low-earth-orbit satellite group includes the recording device 43 as the edge server 42, data indicating a content is uploaded from the ground to the edge server 42, the edge server 42 retains the uploaded data, and the edge server 42 uploads, as required, the data indicating the content to the geostationary satellite 30 via the circular communication network and the LEO-GEO communication, thereby making distributed management possible. FIG. 14 is a diagram for describing the satellite communication system 1 according to the present operation example.

Note that when each low-earth-orbit satellite 80 configuring the low-earth-orbit satellite group is made as the edge server 42, it is rational to make a configuration in which the low-earth-orbit satellite group adopts an orbit with Local Sun Time 06:00 or 18:00, which is a sun-synchronous orbit called a dawn-dusk orbit, and exhaustion of heat of the recording device 43 with high heating is performed on an anti-sun side.

A method in which the low-earth-orbit satellite 80 also serves as the edge server 42 is described in [Reference Literature 1] and so forth.

REFERENCE LITERATURE 1

WO 2022/065256 pamphlet

Operation Example 7 According to Embodiment 2

Figure 15:
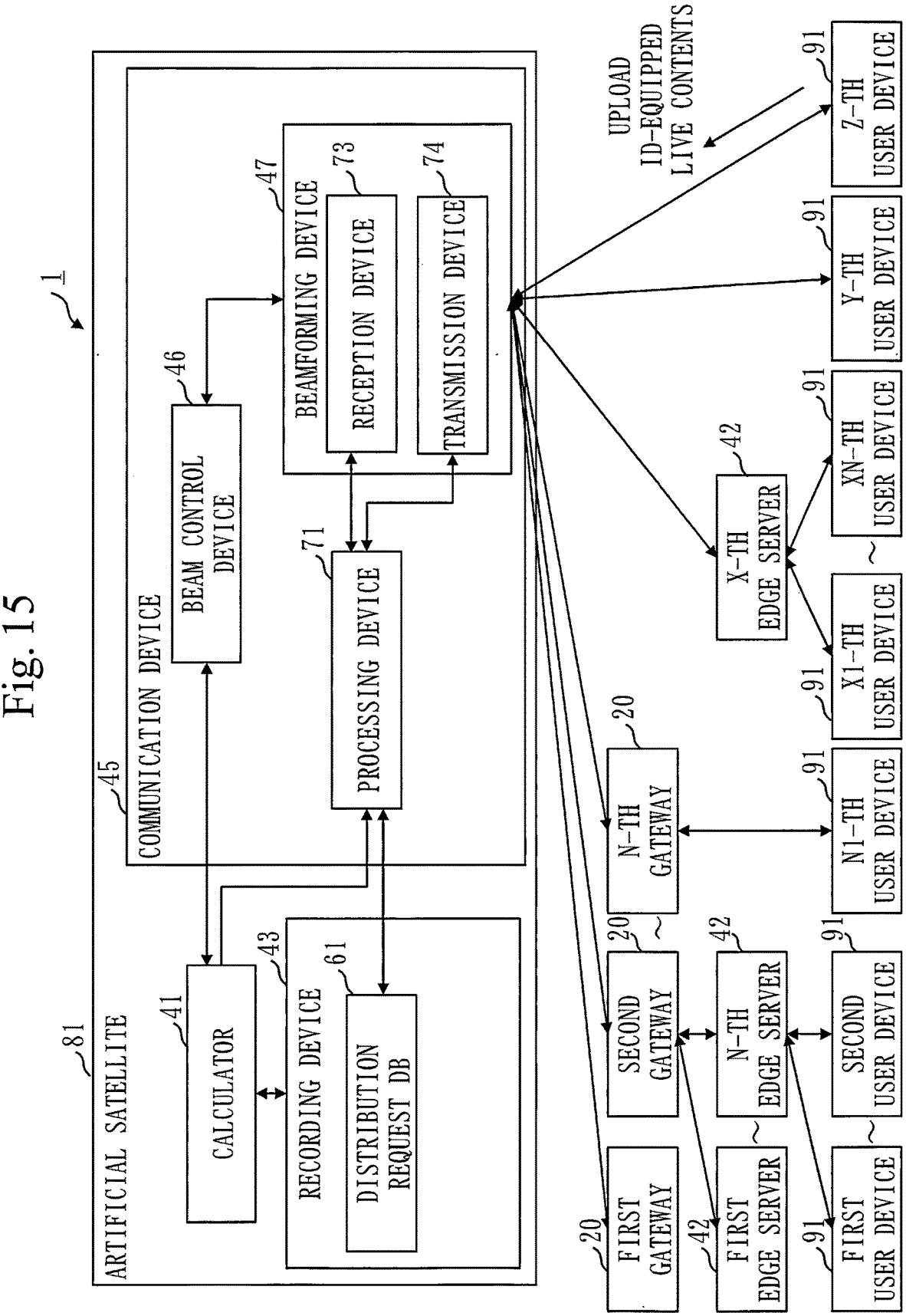
FIG. 15 is a diagram illustrating a configuration example of the satellite communication system 1 according to Embodiment 2.

FIG. 15 illustrates a configuration example of the satellite communication system 1 according to the present operation example. The satellite communication system 1 performs a live video content distribution method. In the following, differences from the operation example 1 according to Embodiment 2 are mainly described.

In the present operation example, an artificial satellite 81 directly or indirectly communicates with each upload device configuring the upload device group.

The communication device 45 includes the reception device 73, the transmission device 74, and the processing device 71. Each upload device configuring the upload device group is any of the edge server 42 and the user device 91.

Operation Example 7 According to Embodiment 2

FIG. 15 illustrates a configuration example of the satellite communication system 1 according to the present operation example. The satellite communication system 1 performs a live video content distribution method. In the following, differences from the operation example 1 according to Embodiment 2 are mainly described.

In the present operation example, an artificial satellite 81 directly or indirectly communicates with each upload device configuring the upload device group.

The communication device 45 includes the reception device 73, the transmission device 74, and the processing device 71. Each upload device configuring the upload device group is any of the edge server 42 and the user device 91.

When indirectly communicating with a target upload device, which is any upload device configuring the upload device group, the artificial satellite 81 communicates with the target upload device via the gateway 20.

The recording device 43 has the distribution request DB 61 stored therein. The distribution request DB 61 is a database obtained by making data indicating distribution requests for identifier-equipped live video contents into database form. The recording device 43 has stored, in the distribution request DB 61, the data indicating distribution requests for the identifier-equipped live video contents uploaded by at least any of the upload devices configuring the upload device group to the recording device 43 via the communication device 45.

The calculator 41 selects an upload device having uploaded the data indicating a target distribution request, which is a distribution request included in the distribution request DB 61, to the recording device 43 as a selected upload device. The calculator 41 provides the communication device 45 with a distribution instruction for distributing data indicating an identifier-equipped live video content corresponding to the target distribution request via the processing device 71.

The reception device 73 receives the data indicating the identifier-equipped live video content uploaded by at least any of the upload devices configuring the upload device group.

The processing device 71 modulates the data received by the reception device 73 into a transmission signal.

The transmission device 74 distributes, to the selected upload device, the transmission signal obtained by modulation by the processing device 71 as the identifier-equipped live video content corresponding to the target distribution request.

In live relay service called live video distribution, a content is distributed to a user making a request for distribution of a live video content on a real-time basis. Thus, the artificial satellite does not temporarily retain the received data for replay and relay but, without temporary retention of the reception data, modulates the received data by using the processing circuit to generate transmission data, and distributes the generated transmission data to the user making the request for distribution. This satellite communication scheme is referred to as a bent-pipe scheme.

While data indicating an ID-equipped live video content may be uploaded from the edge server 42 to the artificial satellite 81, the user may directly upload that data to the artificial satellite 81.

Each of the edge server 42 and the user device 91 may be present on the ground or present in space.

Multicast and live distribution each have different communication traffic, and the latter has larger communication traffic transmitted from the artificial satellites. However, according to the present operation example, one effect is that readiness of live distribution becomes higher due to future expansion of communication capacity of the artificial satellites. Also, if big users such as enterprises are increased, there is a possibility that the distribution of communication traffic is changed.

In the present operation example, the target edge server, which is the edge server 42 configuring the upload device group, may collect data indicating a distribution request from at least one user device 91 configuring the upload device group and directly or indirectly upload the collected data to the recording device 43 included in the artificial satellite 81. Also, the artificial satellite 81 may distribute an identifier-equipped live video content corresponding to the data indicating the distribution request uploaded to the recording device 43.

In the present operation example, the target edge server, which is the edge server 42 configuring the upload device group, may receive, as low-earth-orbit satellite collection data, from a low-earth-orbit broadband constellation, data indicating a distribution request collected by the low-earth-orbit broadband constellation from at least one user device 91 configuring the upload device group and directly or indirectly upload the received low-earth-orbit satellite collection data to the recording device 43.

Operation Example 8 According to Embodiment 2

The present operation example corresponds to an operation example obtained by expanding the operation example 7 according to Embodiment 2, and corresponds to an example of a live video content distribution method.

In the present operation example, the artificial satellite 81 is a geostationary satellite, and may include a GEO-LEO communication device. At least one low-earth-orbit satellite 80 configuring a low-earth-orbit broadband constellation includes a GEO-LEO communication device. The artificial satellite 81 and the low-earth-orbit broadband constellation are communicably connected to each other via a GEO-LEO communication line.

The low-earth-orbit broadband constellation collects data indicating a distribution request from at least one user device 91 configuring an upload device group, and uploads the collected data via the GEO-LEO communication line to the recording device 43 included in the artificial satellite 81.

The artificial satellite 81 distributes an identifier-equipped live video content corresponding to the data indicating the distribution request uploaded to the recording device 43.

Operation Example 9 According to Embodiment 2

The present operation example corresponds to an operation example obtained by expanding the operation example 7 according to Embodiment 2.

A space data center according to the present operation example is formed of a group of geostationary satellites arranged in a distributed manner to a longitudinal direction and a low-earth-orbit broadband constellation. The geostationary satellite group is configured of four or more artificial satellites 81.

The recording device 43 included in each artificial satellite 81 configuring the geostationary satellite group is the edge server 42. Each artificial satellite 81 configuring the geostationary satellite group is the geostationary satellite 30, and includes a GEO-GEO communication device. Three or more artificial satellites 81 configuring the geostationary satellite group form a circular communication network over the equator. At least one artificial satellite 81 configuring the geostationary satellite group includes a GEO-LEO communication device.

At least one low-earth-orbit satellite 80 configuring the low-earth-orbit broadband constellation includes a GEO-LEO communication device.

The geostationary satellite group and the low-earth-orbit broadband constellation communicate with each other by using the GEO-LEO communication devices.

The low-earth-orbit broadband constellation collects data indicating a distribution request from at least one user device 91 configuring an upload device group, and uploads the collected data to the recording device 43 included in the artificial satellite 81 configuring the geostationary satellite group.

The geostationary satellite group and the low-earth-orbit broadband constellation perform the live video content distribution method described in the operation example 8 according to Embodiment 2.

To achieve live video distribution to users all over the world, it is rational to make real-time distribution simultaneously to each user widely present by using bent-pipe broadcast function of the artificial satellite.

According to a communication satellite in a geostationary orbit, it is possible to receive data indicating a content from a live video distribution user, modulate the data received on a real-time basis in the orbit, and perform live distribution to each user widely present by using the modulated data with the bent-pipe-scheme broadcast function. Also, three or more geostationary satellites 30 can perform live distribution to the entire world via a circular communication network in the geostationary orbit.

Note that as for each user present in high-altitude regions including polar regions, there is a limit of a communication field of view of the geostationary satellite. Thus, as for the high-altitude regions, it is rational to perform live distribution via the low-earth-orbit broadband constellation.

Operation Example 10 According to Embodiment 2

The present operation example corresponds to an operation example obtained by expanding the operation example 1 or 7 according to Embodiment 2.

The communication device 45 according to the present operation example includes the beam control device 46 and the beamforming device 47.

With the communication device 45 including the beam control device 46 and the beamforming device 47, it is possible to relatively efficiently distribute contents to the selected gateway 20, the selected edge server 42, or the selected user device 91, with large-capacity concentrated beams called a spot beam.

Operation Example 11 According to Embodiment 2

The present operation example corresponds to an operation example obtained by expanding the operation example 10 according to Embodiment 2.

At least part of upload devices configuring an upload device group according to the present operation example is a mobile body.

Internet use in mobile bodies such as ships and airplanes have progressed. As a result, with each mobile body assuming a role of the edge server 42, it is possible to provide communication service to passengers. Also, a person-owned ship or airplane can behave as a user.

The artificial satellite 81 including the beam control device 46 can change the direction of the communication beam in accordance with the position of the mobile body.

Operation Example 12 According to Embodiment 2

The present operation example corresponds to an operation example obtained by expanding the operation example 1 according to Embodiment 2.

By using an inference model that has learned a relation between a distribution and time changes of communication traffic of identifier-equipped contents in the plurality of edge servers 42 configuring an upload device group, the calculator 41 according to the present operation example analyzes a priority level for distributing each identifier-equipped content of the plurality of identifier-equipped contents and an order of distributing each identifier-equipped content of the plurality of identifier-equipped contents to each upload device, and determines a sequence of distributing the contents by beam control.

If AI space use progresses and an inference model is used in which a distribution situation of distribution requests for ID-equipped contents in each edge server 42 and time changes of the distribution situation are learned and each of daily changes, seasonal changes, changes of a configuration ratio between the number of personal users and the number of corporate users, and a future increase or decrease of ID-equipped content requests with an influence of an event occurring on the ground or the like is predicted, one effect is that it is possible to quickly and rationally achieve content distribution by relay replay, the total amount of communication traffic is decreased, and satellite resources such as electric power can be reduced.

As the development of the digital communication environment progresses, needs for on-demand distribution and live video distribution are increased. As measures for mitigating a situation in which communication traffic on the ground is excessive, wide and rational content distribution by satellite communication has been awaited.

As a result of the advance of full digitalization and flexibility of the communication satellite, the communication satellite can directly communicate not only with the plurality of gateways 20 disposed on the ground but also with the plurality of edge servers 42 and the plurality of user devices 91. Also, with the communication device 45 including the beam control device 46 and the beamforming device 47, the communication device 45 can selectively communicate with the edge servers 42 and the user devices 91 widely and unevenly distributed, and can quickly and rationally transmit digital data.

As a configuration of achieving on-demand distribution by satellite communication, a configuration is required in which the recording device 43 has stored therein data indicating ID-equipped contents and the replay relay device 72 distributes the data stored in the recording device 43. Also, to achieve on-demand distribution, a mechanism of collecting distribution requests for ID-equipped contents is required.

Thus, in the operation example 1 according to Embodiment 2, data indicating distribution requests for ID-equipped contents collected by the edge server 42 for use by a content distribution business entity is stored in the recording device 43, the calculator 41 selects the edge server 42 collecting many distribution requests, and an ID-equipped content is distributed by the replay relay device 72.

Note that a method of determining whether each edge server 42 has collected many distribution requests varies. The method may be a method of determining in advance by the content distribution business entity a number of requests, which is a criterion for determining whether the number of distribution requests is large, or may be a method of selecting a predetermined number of edge servers 42 in the order in which the collected distribution requests are larger, by relative comparison among the plurality of edge servers 42.

Operation Example 13 According to Embodiment 2

A space data center according to the present operation example includes a geostationary satellite group, a low-earth-orbit satellite group, and a ground installation. The geostationary satellite group is configured of three or more geostationary satellites 30 arranged in a distributed manner to a longitudinal direction. The low-earth-orbit satellite group is configured of a plurality of low-earth-orbit satellites 80. The ground installation operates and controls each of the geostationary satellite group and the low-earth-orbit satellite group.

Each geostationary satellite 30 configuring the geostationary satellite group includes the edge server 42 and the replay relay device 72, and includes a GEO-GEO communication device. The geostationary satellite group forms a circular communication network over the equator. At least one of the geostationary satellites 30 configuring the geostationary satellite group includes a GEO-LEO communication device.

Each low-earth-orbit satellite 80 configuring the low-earth-orbit satellite group flies on any of a plurality of orbit planes arranged in a distributed manner to a longitudinal direction. Each low-earth-orbit satellite 80 orbiting in a low-earth orbit on each orbit plane of the plurality of orbit planes performs bidirectional communication with each of the low-earth-orbit satellites 80 flying at front and rear of each low-earth-orbit satellite to form a circular communication network, and each orbit plane of the plurality of orbit planes performs interorbital communication with another orbit plane. The low-earth-orbit satellite group thereby forms a mesh communication network. At least one low-earth-orbit satellite 80 configuring the low-earth-orbit satellite group includes a GEO-LEO communication device. At least one low-earth-orbit satellite 80 configuring the low-earth-orbit satellite group includes the edge server 42.

The geostationary satellite group and the low-earth-orbit satellite group perform bidirectional communication by using the GEO-LEO communication device.

The low-earth-orbit satellite group collects data indicating a distribution request from at least one user device 91 configuring an upload device group, and uploads the collected data to a target edge server, which is the edge server 42 included in the geostationary satellite 30 configuring the geostationary satellite group.

Each upload device configuring the upload device group is any of the edge server 42 and the user device 91.

The geostationary satellite group distributes an on-demand content corresponding to a distribution request indicated by the data uploaded by each upload device to each upload device having uploaded the data indicating a distribution request to the target edge server.

Operation Example 14 According to Embodiment 2

In one example according to the present operation example, a business device performs the on-demand content distribution method described in any one of the operation examples 2 to 4 according to Embodiment 2, and also includes a communication-line-use monitor device. The communication-line-use monitor device measures communication traffic of the on-demand contents, and records data indicating the result of measurement.

In one example according to the present operation example, a business device performs the on-demand content distribution method described in any one of the operation examples 2 to 4 according to Embodiment 2, and also includes a server-use monitor device. The server-use monitor device records the data amount of each on-demand contents and data indicating a retention period of each on-demand content.

In one example according to the present operation example, a business device includes a communication-line-use monitor device and a server-use monitor device. The business device performs on-demand distribution at the space data center described in the operation example 13 according to Embodiment 2.

In one example according to the present operation example, the recording device 43 includes, as a monitor device, a communication-line-use monitor device or a server-use monitor device. In the present example, the calculator 41 updates a learning inference algorithm of the inference model by performing machine learning of output information from the monitor device.

Stakeholders engaging in on-demand content distribution include: a content distribution business entity; a satellite operation business entity; a network business entity; a server business entity such as one with a cloud server, edge server, or the like; and a low-earth-orbit satellite communication business entity. In operation of a system for distributing on-demand contents, income by billing from users is taken as a source of fund, and the operation of the system is established based on a mutual contractual relation regarding a communication-line use fee and a server use fee. Thus, with each business entity including a communication-line-use monitor device and a server-use monitor device, it is possible to clarify grounds for calculation with regard to the giving and receiving of use fees. The information collected by each device is information conducive to optimization of system operation, such as the number and arrangement of the plurality of edge servers 42, and content updating frequency and retention period. Here, each of the communication-line-use monitor device and the server-use monitor device performs a process based on a mutual transparent algorithm among business entities regarding on-demand content distribution.

Also, in recent years, new business categories have been arising by joint ventures or teaming by a plurality of stakeholders.

If part or all of a satellite operation business entity, a server business entity, a network business entity, a low-earth-orbit broadband constellation business entity, and a content distribution business entity grapple a space data center business and practice a business of taking U.S. Hollywood movies or Korean dramas, and further Japanese animation works as on-demand distribution contents, utilizing automatic translation, and performing an on-demand content distribution method, thereby distributing the on-demand distribution contents from the space data center, it is possible to perform on-demand content distribution for all users all over the world even those who are present in an area where digital communication infrastructure has not been developed.

Here, also for setting contract conditions in accordance with the degree of contribution of each of the plurality of business entities and monitoring the actual situations of activities, the communication-line-use monitor device and the server-use monitor device are effective.

Operation Example 15 According to Embodiment 2

In one example of the present operation example, the business device according to the operation example 14 of Embodiment 2 includes an automatic translation device. The business device automatically translates spoken language included in an on-demand content or a live video content by using the automatic translation device, and distributes data including the automatic translation result.

In one example of the present operation example, the replay relay device 72 according to the operation example 1 of Embodiment 2 includes an automatic translation device. The automatic translation device performs automatic translation on spoken language included in each identifier-equipped content. The replay relay device 72 modulates data indicating the result of performing automatic translation into a transmission signal.

While the content business device may perform machine translation, since the performance of machine translation has been increased, a satellite operation business entity may perform machine translation by using a relay processing circuit of an artificial satellite. Note that automatic translation in orbit by the artificial satellite corresponds to performing machine translation by a business device that operates the satellite.

Operation Example 16 According to Embodiment 2

In the present operation example, a content distribution business device includes a communication-line-use monitor device and a server-use monitor device. The content distribution business device performs the on-demand content distribution method described in any one of the operation examples 2 to 4 according to Embodiment 2 or the live video content distribution method described in the operation example 7 or 8 according to Embodiment 2, thereby counting communication-line use fees and server use fees.

Operation Example 17 According to Embodiment 2

In the present operation example, a network business device includes a communication-line-use monitor device. The network business device counts communication-line use fees, which are use fees charged to a content business device performing the on-demand content distribution method described in any one of the operation examples 2 to 4 according to Embodiment 2 or the live video content distribution method described in the operation example 7 or 8 according to Embodiment 2.

Operation Example 18 According to Embodiment 2

In the present operation example, a server business device includes a server-use monitor device, and charges a server use fee, which is a consideration for lending of a memory area of at least any of the cloud server and the edge server 42. The server business device counts server use fees charged to a content business device performing the on-demand content distribution method described in any one of the operation examples 2 to 4 according to Embodiment 2 or the live video content distribution method described in the operation example 7 or 8 according to Embodiment 2.

Operation Example 19 According to Embodiment 2

In the present operation example, a space data center business device is configured of all or part of the content business device, the network business device, and the server business device that perform on-demand distribution in the space data center described in the operation example 14 according to Embodiment 2.

Operation Example 20 According to Embodiment 2

The business device according to the present operation example is a business device configuring the space data center business device described in the operation example 19 according to Embodiment 2, and is any of the content business device, the network business device, and the server business device.

Operation Example 21 According to Embodiment 2

In one example according to the present operation example, a ground installation operates and controls the space data center described in any one of the operation examples 5, 6, 9, and 14 according to Embodiment 2. The configuration of the ground installation may be similar to the configuration of the ground data center 90.

In one example according to the present operation example, a ground installation operates and controls the artificial satellite described in the operation example 1 or 7 according to Embodiment 2.

Operation Example 22 According to Embodiment 2

A low-earth-orbit broadband constellation business device according to the present operation example charges a communication-line use fee to a communication-line-use business device by a low-earth-orbit broadband constellation. The low-earth-orbit broadband constellation business device includes the low-earth-orbit satellite 80 including a GEO-LEO communication device, and uploads data indicating a distribution request from a user by the on-demand content distribution method described in the operation example 4 according to Embodiment 2.

Description of Effects of Embodiment 2

Figure 16:
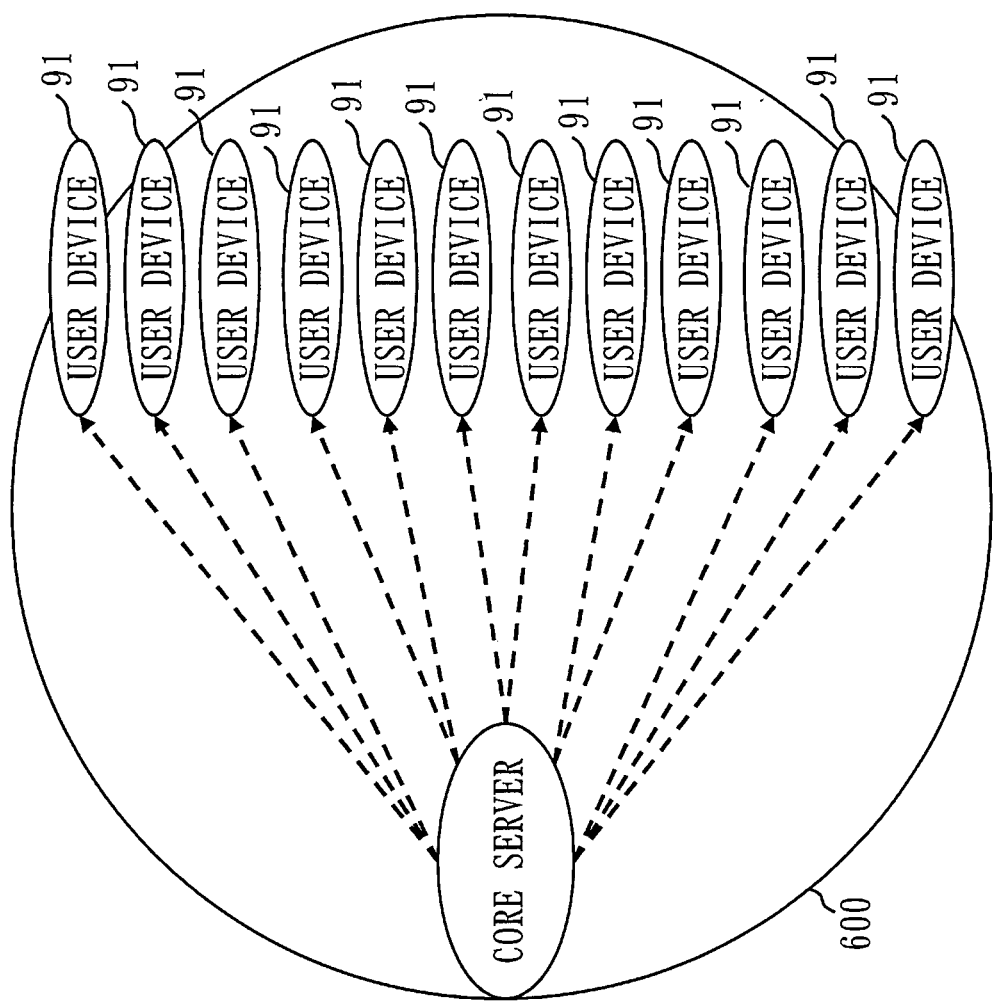
FIG. 16 is a diagram for describing an effect of Embodiment 2.

FIG. 16 is a diagram for describing conventional content distribution. In FIG. 16, distribution from a ground core server to users is illustrated. In the conventional content distribution, contents are stored in the core server disposed on the ground and distributed to users via ground communication lines. In this case, contents are distributed individually even to a user who is present at a remote location. Thus, in the conventional content distribution, load concentration on the core server and an increase in communication traffic by repeatedly performing long-distance communication pose a problem.

Figure 17:
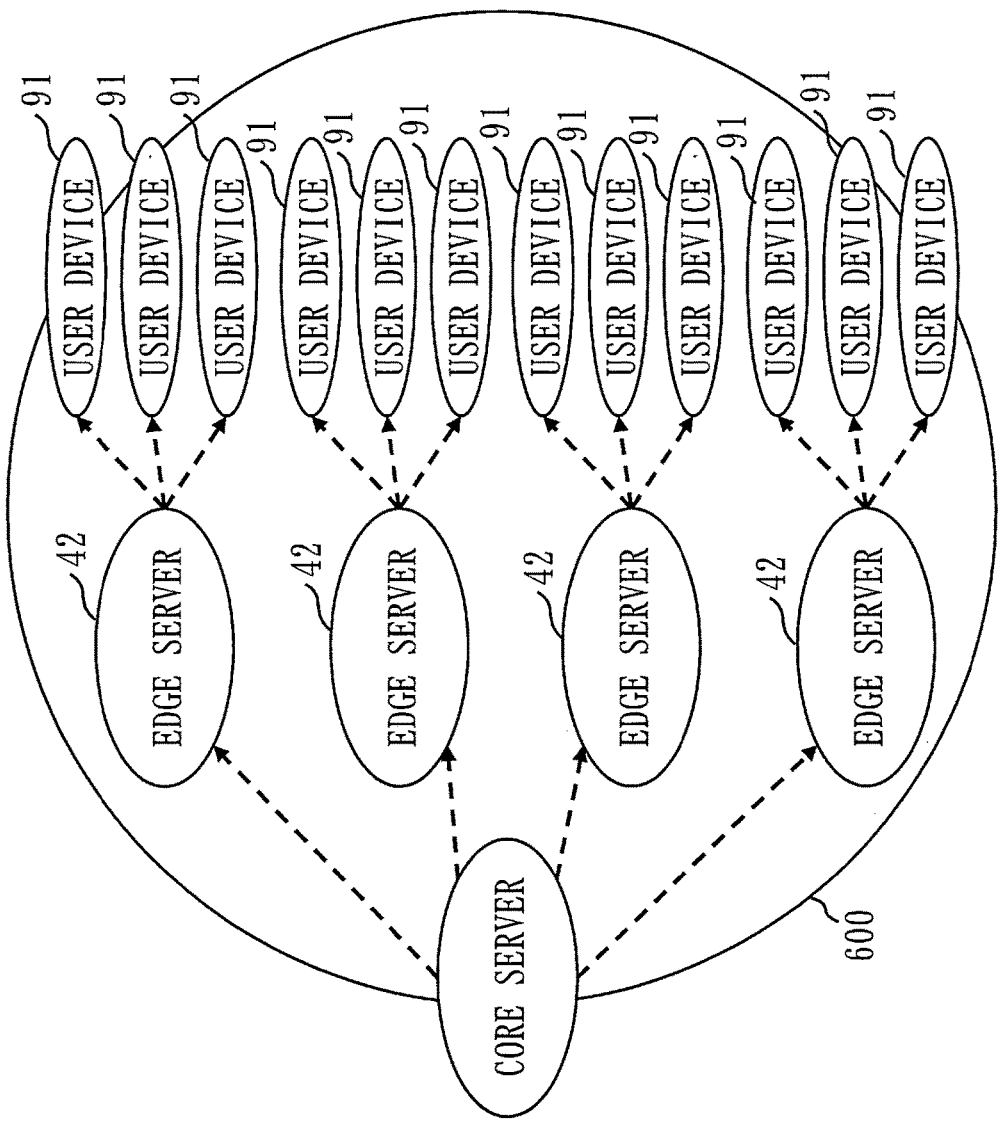
FIG. 17 is a diagram for describing an effect of Embodiment 2.

As means for solving this problem, there is means in which a plurality of edge servers 42 are arranged in a distributed manner, contents are stored (pre-cast) in advance from the core server to each edge server 42, and a content is distributed from each edge server 42 to a nearby user device 91. FIG. 17 is a diagram for describing the present means. In FIG. 17, distributed distribution to users via the ground edge servers is illustrated. With this means, load distribution and reduction in the number of times of long-distance communication are achieved.

Figure 18:
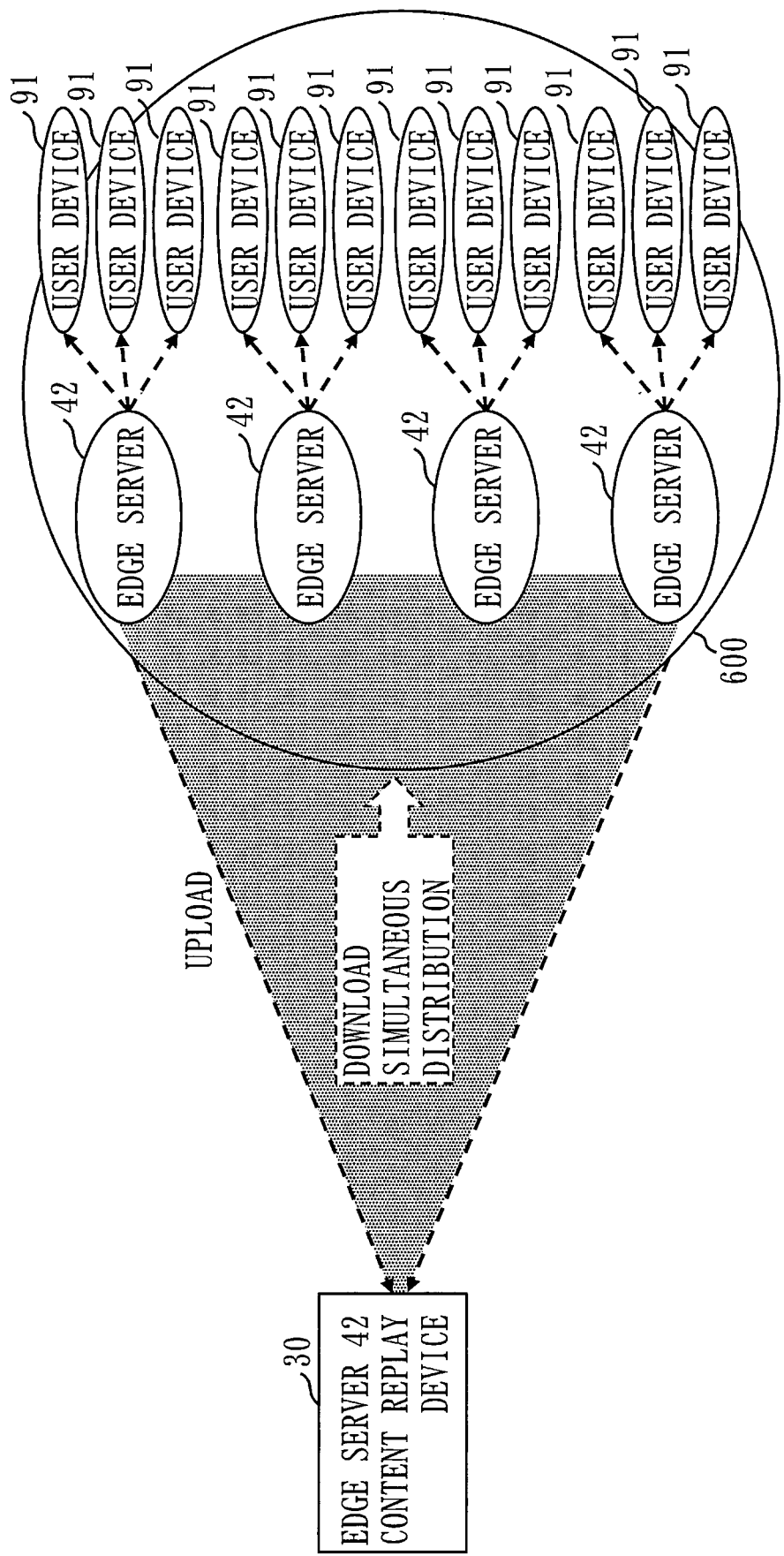
FIG. 18 is a diagram for describing an effect of Embodiment 2.

In one example of an on-demand content distribution method according to the present embodiment, the functions of a core server are transferred to the edge server 42 included in the artificial satellite, and precast of a content to each edge server 42 arranged in a distributed manner on the ground is achieved by simultaneous distribution (multicast) from the artificial satellite. FIG. 18 is a diagram for describing the present example. In FIG. 18, simultaneous distribution from a satellite to the ground edge server and distributed distribution from the ground edge server to users are illustrated. According to the present example, repeatedly performing long-distance communication for precast of a content from the core server to each edge server 42 is eliminated, thereby making it possible to reduce a total amount of communication traffic.

The effect of improvement in communication traffic with multicast is thought to depend on a statistical distribution of popularity of contents. Here, there is an analytical result in which distribution of the top-twenty popular contents occupies 80 percent of all distribution. When this analysis result is actually achieved, simultaneous distribution of the top-twenty contents is performed to the edge servers 42 with which a wide area is dotted by the on-demand content distribution method according to the present embodiment, and distribution service is performed from each edge server 42 to its nearby user device 91. In this case, one effect is that the total amount of communication traffic corresponding to long-distance communication from the core server to each edge server 42 is decreased to 20 percent.

The method of direct multicast to users is, as a specific example, a method in which the user device 91 uploading data indicating a distribution request for an on-demand content downloads data indicating a key for deciphering the on-demand content and data indicating a time table indicating a simultaneous distribution schedule of the content and perform downloading in a storage of the user device 91 in a manner similar to with video recording of a BS (Broadcasting Satellite) broadcast program. Here, in BS broadcasting, the time equal to the replay time of the content is required as a recording time. However, according to the on-demand content distribution method of the present embodiment, the content download time is a short time. Thus, according to the present embodiment, one effect is that the content distribution business entity can distribute various contents.

Also, one effect is that, by increasing the distribution frequency of highly popular contents, it is possible to shorten user's distribution waiting time.

In the cinema complex in recent years, a plurality of screens are provided inside the same facility, and many popular contents are simultaneously screened in a repeated manner to lure customers. Here, with sophistication of the beam control function of artificial satellites, by utilizing the beam control function, various contents are simultaneously distributed repeatedly a plurality of times by using a different frequency, different area, and different time zone, which can be thought as an analogy of the cinema complex. With this analogy, one effect is that on-demand content options selectable by users and the degree of flexibility of a time zone for reception are increased.

Also, if release of a new movie and content distribution toward all over the world by the on-demand content distribution method according to the present embodiment are simultaneously achieved in the future, various new movies can be distributed even in an area where no facility like a cinema complex is present and the number of contents to be screened is limited. Also, while real-time binding is necessary in movie theaters, the download time of digital contents is short. Thus, an effect of luring users by utilizing the on-demand content distribution method according to the present embodiment is expected to be increased.

In recent years, the home delivery system has been sophisticated, and many commodities purchased online are delivered overnight. Here, as an analogy of the home delivery system, it can be thought that a space data center assumes a role of an automatic pickup-and-delivery system in the home delivery system to collect digital contents in response to distribution requests for the digital contents and simultaneously distribute the digital contents at night with less communication traffic. Night communication allows users to save communication costs. In the home delivery system, rationalization is achieved by delivery people sharing deliveries of various contents for each area. Meanwhile, in the on-demand content distribution system according to the present embodiment, one effect can be said that artificial satellites assume a role of delivery people over a wide area to rationalize the distribution system.

In the on-demand content distribution business under present circumstances, users pay a fee for a content and also pay a communication fee to a communication business entity. On the other hand, if an investment collection model by content billing is created in which a business entity deploying a business regarding the on-demand content distribution method according to the present embodiment bills fees including an orbital-server use fee and a communication-line use fee, it is possible to achieve a user billing model that is highly competitive with an increase in efficiency by satellite multicast.

Other Embodiments

Though Embodiment 1 and 2 have been described, a plurality of portions of the present embodiment may be embodied in combination. Alternatively, the present embodiment may be partially embodied. Otherwise, the present embodiment may be modified in various manners as appropriate and may be generally or partially embodied in any combination.

Incidentally, the embodiments described above intrinsically adduce preferred examples and are not intended for limiting the present disclosure, applications thereof, and the scopes of uses thereof. Described procedures may be modified appropriately.

REFERENCE SIGNS LIST

1: satellite communication system; 20: gateway; 30: geostationary satellite; 31: satellite control device; 32: communication device; 33: propulsion device; 34: attitude control device; 35: power supply device; 41: calculator; 42: edge server; 43: recording device; 45: communication device; 46: beam control device; 47: beamforming device; 50: ground system; 61: distribution request DB; 62: distribution contents; 71: processing device; 72: replay relay device; 73: reception device; 74: transmission device; 80: low-earth-orbit satellite; 81: artificial satellite; 90: ground data center; 91, 91B, 91C: user device; 600: earth; 710: processor; 711: control unit; 720: main storage device; 730: auxiliary storage device; 740: input interface; 750: output interface; 760: communication interface; 770: signal line; 780: electronic circuit; 810: ground-side communication device.

The invention claimed is:

1. An artificial satellite comprising:
a recording device;
a calculator; and
a communication device, wherein
the communication device includes a beam control device and a beamforming device,
the recording device has recorded therein information indicating communication traffic between the communication device and at least any of a plurality of gateways disposed on ground,
when imbalances in communication traffic among the plurality of gateways are present, by using an inference model that has learned a relation between imbalances in communication traffic among the plurality of gateways and variable parameter values for controlling the beamforming device, the calculator derives the variable parameter values so that the imbalances in communication traffic among the plurality of gateways decrease, and transmits information indicating the derived variable parameter values to the beam control device, and
the beam control device receives the information indicating the variable parameter values derived by the calculator and controls the beamforming device based on the variable parameter values indicated by the received information.

2. The artificial satellite according to claim 1, wherein
the calculator derives the variable parameter values by using an optimization algorithm.

3. The artificial satellite according to claim 2, wherein
the optimization algorithm is an algorithm generated based on a result of analyzing the variable parameter values for decreasing imbalances in the communication traffic among the plurality of gateways by simulation.

4. A satellite communication system comprising:
the artificial satellite according to claim 1;
a ground system to transmit information indicating imbalances in the communication traffic among the plurality of gateways to the artificial satellite; and
the plurality of gateways.

5. An artificial satellite comprising:
an edge server of a ground data center disposed on ground;
a recording device;
a calculator; and
a communication device, wherein
the edge server includes the recording device and receives, from a ground system, information indicating imbalances in communication traffic among a plurality of gateways disposed on the ground,
the communication device includes a beam control device and a beamforming device,
the recording device has recorded therein information indicating communication traffic between the communication device and at least any of the plurality of gateways,
when imbalances in communication traffic among the plurality of gateways are present, by using an inference model that has learned a relation between imbalances in communication traffic among the plurality of gateways and variable parameter values for controlling the beamforming device, the calculator derives the variable parameter values so that imbalances in communication traffic among the plurality of gateways decrease, and transmits information indicating the derived variable parameter values to the beam control device, and the beam control device receives the information indicating the variable parameter values derived by the calculator and controls the beamforming device based on the variable parameter values indicated by the received information.

6. An artificial satellite to directly or indirectly communicate with each upload device configuring an upload device group configured of at least one upload device that is present on ground, the artificial satellite comprising:

a recording device to have stored therein a distribution request database obtained by making data indicating distribution requests for identifier-equipped contents into database form;

a calculator; and a communication device including a reception device, a transmission device, a processing device, and a replay relay device, wherein each upload device configuring the upload device group is any of an edge server and a user device, when indirectly communicating with a target upload device, which is any upload device configuring the upload device group, the artificial satellite communicates with the target upload device via a gateway, the recording device has stored therein data indicating an identifier-equipped content uploaded by at least any upload device configuring the upload device group to the recording device via the communication device, and has stored, in the distribution request database, data indicating a distribution request for the identifier-equipped content uploaded by the at least any upload device configuring the upload device group to the recording device via the communication device, the calculator
  selects the upload device having uploaded the data indicating a target distribution request, which is a distribution request included in the distribution request database, to the recording device as a selected upload device, and
  provides the communication device with a distribution instruction for distributing data indicating an identifier-equipped content corresponding to the target distribution request via the replay relay device, the reception device receives the data indicating the identifier-equipped content uploaded by the at least any upload device configuring the upload device group, the processing device converts the data received by the reception device into data in storable form in the recording device and causes the converted data to be stored in the recording device, the replay relay device modulates, based on the distribution instruction, the data indicating the identifier-equipped content stored in the recording device into a transmission signal, and the transmission device transmits, to the selected upload device, the transmission signal obtained by modulation by the replay relay device as the identifier-equipped content corresponding to the target distribution request.

7. An on-demand content distribution method, wherein a target edge server, which is an edge server configuring the upload device group, collects data indicating a distribution request from at least one user device configuring the upload device group, and directly or indirectly uploads the collected data to the recording device included in the artificial satellite according to claim 6, and the artificial satellite distributes an identifier-equipped content corresponding to the data indicating the distribution request uploaded to the recording device.

8. An on-demand content distribution method, wherein a target edge server, which is an edge server configuring the upload device group, receives, as low-earth-orbit satellite collection data, from a low-earth-orbit broadband constellation, data indicating a distribution request collected by the low-earth-orbit broadband constellation from at least one user device configuring the upload device group, and directly or indirectly uploads the received low-earth-orbit satellite collection data to the recording device included in the artificial satellite according to claim 6, and the artificial satellite distributes an identifier-equipped content corresponding to the data indicating the distribution request uploaded to the recording device.

9. An on-demand content distribution method, wherein:

the artificial satellite according to claim 6 is a geostationary satellite, and includes a GEO-LEO communication device to perform communication between the geostationary satellite and a low-earth-orbit satellite, at least one low-earth-orbit satellite configuring a low-earth-orbit broadband constellation includes the GEO-LEO communication device, the artificial satellite and the low-earth-orbit broadband constellation are communicably connected to each other via a GEO-LEO communication line, which is a communication line between the geostationary satellite and the low-earth-orbit satellite, the low-earth-orbit broadband constellation collects data indicating a distribution request from at least one user device configuring the upload device group, and uploads the collected data to the recording device included in the artificial satellite via the GEO-LEO communication line, and the artificial satellite distributes an identifier-equipped content corresponding to the data indicating the distribution request uploaded to the recording device.

10. A space data center formed of a geostationary satellite group and a low-earth-orbit broadband constellation, the geostationary satellite group being configured of three or more artificial satellites according to claim 6 arranged in a distributed manner to a longitudinal direction, wherein the recording device included in each artificial satellite configuring the geostationary satellite group is an edge server, each artificial satellite configuring the geostationary satellite group is a geostationary satellite, and includes a GEO-GEO communication device to perform bidirectional communication between artificial satellites adjacent to each other over the equator, three or more artificial satellites configuring the geostationary satellite group form a circular communication network over the equator, at least one artificial satellite configuring the geostationary satellite group includes a GEO-LEO communication device to perform communication between the geostationary satellite and a low-earth-orbit satellite, at least one low-earth-orbit satellite configuring the low-earth-orbit broadband constellation includes the GEO-LEO communication device, the geostationary satellite group and the low-earth-orbit broadband constellation communicate with each other by using the GEO-LEO communication devices, the low-earth-orbit broadband constellation collects data indicating a distribution request from at least one user device configuring the upload device group, and uploads the collected data to the recording device included in the artificial satellite configuring the geostationary satellite group, and the geostationary satellite group and the low-earth-orbit broadband constellation perform the on-demand content distribution method, wherein:

each of the artificial satellites is a geostationary satellite, and includes a GEO-LEO communication device to perform communication between the geostationary satellite and a low-earth-orbit satellite, at least one low-earth-orbit satellite configuring a low-earth-orbit broadband constellation includes the GEO-LEO communication device, the artificial satellite and the low-earth-orbit broadband constellation are communicably connected to each other via a GEO-LEO communication line, which is a communication line between the geostationary satellite and the low-earth-orbit satellite, the low-earth-orbit broadband constellation collects data indicating a distribution request from at least one user device configuring the upload device group, and uploads the collected data to the recording device included in the artificial satellite via the GEO-LEO communication line, and the artificial satellite distributes an identifier-equipped content corresponding to the data indicating the distribution request uploaded to the recording device.

11. A space data center formed of a geostationary satellite group and a low-earth-orbit broadband constellation, the geostationary satellite group being configured of three or more artificial satellites according to claim 6 disposed in a distributed manner to a longitudinal direction, wherein:

each artificial satellite configuring the geostationary satellite group is a geostationary satellite, and includes a GEO-GEO communication device to perform bidirectional communication between artificial satellites adjacent to each other over the equator, the geostationary satellite group forms a circular communication network over the equator, in the low-earth-orbit broadband constellation, a plurality of orbit planes are arranged in a distributed manner to the longitudinal direction, each low-earth-orbit satellite orbiting in a low-earth orbit on each orbit plane of the plurality of orbit planes performs bidirectional communication with each of the low-earth-orbit satellites flying at front and rear of each low-earth-orbit satellite to form a circular communication network, and each orbit plane of the plurality of orbit planes performs interorbital communication with another orbit plane, thereby forming a mesh communication network in the low-earth-orbit broadband constellation, at least one artificial satellite configuring the geostationary satellite group includes a GEO-LEO communication device to perform communication between the geostationary satellite and the low-earth-orbit satellite, at least one low-earth-orbit satellite configuring the low-earth-orbit broadband constellation includes the GEO-LEO communication device, the geostationary satellite group and the low-earth-orbit broadband constellation perform bidirectional communication by using the GEO-LEO communication devices, at least one low-earth-orbit satellite configuring the low-earth-orbit broadband constellation includes an edge server, the low-earth-orbit broadband constellation collects data indicating a distribution request from at least one user device configuring the upload device group, and uploads the collected data to the recording device included in the artificial satellite configuring the geostationary satellite group, and the artificial satellite and the low-earth-orbit broadband constellation perform the on-demand content distribution method, wherein:

each of the artificial satellites is a geostationary satellite, and includes a GEO-LEO communication device to perform communication between the geostationary satellite and a low-earth-orbit satellite, at least one low-earth-orbit satellite configuring a low-earth-orbit broadband constellation includes the GEO-LEO communication device, the artificial satellite and the low-earth-orbit broadband constellation are communicably connected to each other via a GEO-LEO communication line, which is a communication line between the geostationary satellite and the low-earth-orbit satellite, the low-earth-orbit broadband constellation collects data indicating a distribution request from at least one user device configuring the upload device group, and uploads the collected data to the recording device included in the artificial satellite via the GEO-LEO communication line, and the artificial satellite distributes an identifier-equipped content corresponding to the data indicating the distribution request uploaded to the recording device.

12. The artificial satellite according to claim 6, wherein the communication device includes a beam control device and a beamforming device.

13. The artificial satellite according to claim 12, wherein at least part of the upload devices configuring the upload device group is a mobile body.

14. The artificial satellite according to claim 6, wherein by using an inference model that has learned a relation between a distribution and time changes of communication traffic of the identifier-equipped contents in a plurality of edge servers configuring the upload device group, the calculator analyzes a priority level for distributing each identifier-equipped content of the plurality of identifier-equipped contents and an order of distributing each identifier-equipped content of the plurality of identifier-equipped contents to each upload device, and determines a sequence of distributing the contents by beam control.

15. A business device to perform the on-demand content distribution method according to claim 7, the business device comprising:

a communication-line-use monitor device to measure communication traffic of on-demand contents and to record data indicating a result of the measurement.

16. A business device to perform the on-demand content distribution method according to claim 7, the business device comprising:

a server-use monitor device to record a data amount of each on-demand content and data indicating a retention period of each on-demand content.

17. The artificial satellite according to claim 14, wherein:
the recording device further includes, as a monitor device,
a communication-line-use monitor device to measure communication traffic of on-demand contents and to record data indicating a result of the measurement or a server-use monitor device to record a data amount of each on-demand content and data indicating a retention period of each on-demand content
the calculator updates a learning inference algorithm of the inference model by performing machine learning of output information from the monitor device.

18. The business device according to claim 15, further comprising:
an automatic translation device, wherein
the business device automatically translates spoken language included in an on-demand content or a live video content by using the automatic translation device, and distributes data including an automatic translation result.

19. The artificial satellite according to claim 6, wherein
the replay relay device includes an automatic translation device,
the automatic translation device performs automatic translation on spoken language included in each identifier-equipped content, and
the replay relay device modulates data indicating a result of performing the automatic translation into a transmission signal.

20. A content distribution business device comprising:
a communication-line-use monitor device to measure communication traffic of on-demand contents and to record data indicating a result of the measurement; and
a server-use monitor device to record a data amount of each on-demand content and data indicating a retention period of each on-demand content, wherein
by performing the on-demand content distribution method according to claim 7 or a live video content distribution method wherein
a target edge server, which is an edge server configuring the upload device group, collects data indicating a distribution request from at least one user device configuring the upload device group, and directly or indirectly uploads the collected data to the recording device included in an artificial satellite including:
a recording device to have stored therein a distribution request database obtained by making data indicating distribution requests for identifier-equipped live video contents into database form;
a calculator; and
a communication device including a reception device, a transmission device, and a processing device, wherein
each upload device configuring the upload device group is any of an edge server and a user device,
when indirectly communicating with a target upload device, which is any upload device configuring the upload device group, the artificial satellite communicates with the target upload device via a gateway,
the recording device has stored, in the distribution request database, data indicating a distribution request for the identifier-equipped live video content uploaded by said at least any upload device configuring the upload device group to the recording device via the communication device,
the calculator
selects the upload device having uploaded the data indicating a target distribution request, which is a distribution request included in the distribution request database, to the recording device as a selected upload device, and
provides the communication device with a distribution instruction for distributing data indicating an identifier-equipped live content corresponding to the target distribution request via the processing device,
the reception device receives the data indicating the identifier-equipped live video content uploaded by the at least any upload device configuring the upload device group,
the processing device modulates the data received by the reception device into a transmission signal, and
the transmission device distributes, to the selected upload device, the transmission signal obtained by modulation by the processing device as the identifier-equipped live video content corresponding to the target distribution request, and
the artificial satellite distributes an identifier-equipped live video content corresponding to the data indicating the distribution request uploaded to the recording device,
the content distribution business device counts a communication-line use fee and a server use fee.

21. A network business device including the communication-line-use monitor device according to claim 15, wherein
the network business device counts communication-line use fees charged to a content business device performing the on-demand content distribution method,
a target edge server, which is an edge server configuring the upload device group, collects data indicating a distribution request from at least one user device configuring the upload device group, and directly or indirectly uploads the collected data to the recording device included in an artificial satellite, and
the artificial satellite distributes an identifier-equipped content corresponding to the data indicating the distribution request uploaded to the recording device,
or a live video content distribution method.

22. A server business device to charge a server use fee, which is a consideration for lending of a memory area of at least any of a cloud server and an edge server, the server business device comprising:
the server-use monitor device according to claim 16, wherein
the server business device counts said server use fees charged to a content business device performing an on-demand content distribution method,
a target edge server, which is an edge server configuring the upload device group, collects data indicating a distribution request from at least one user device configuring the upload device group, and directly or indirectly uploads the collected data to the recording device included in an artificial satellite, and
the artificial satellite distributes an identifier-equipped content corresponding to the data indicating the distribution request uploaded to the recording device,
or a live video content distribution method.

23. A ground installation to operate and control the space data center according to claim 10.

24. A low-earth-orbit broadband constellation business device to charge a communication-line use fee to a communication-line use business device by a low-earth-orbit broadband constellation, the low-earth-orbit broadband constellation business device including:

a low-earth-orbit satellite including a GEO-LEO communication device to perform communication between a geostationary satellite and the low-earth-orbit satellite, wherein the low-earth-orbit broadband constellation business device uploads data indicating a distribution request from a user by the on-demand content distribution method according to claim 9.

25. A space data center including a geostationary satellite group configured of three or more geostationary satellites arranged in a distributed manner to a longitudinal direction, a low-earth-orbit satellite group configured of a plurality of low-earth-orbit satellites, and a ground installation to operate and control each of the geostationary satellite group and the low-earth-orbit satellite group, wherein each geostationary satellite configuring the geostationary satellite group includes an edge server and a replay relay device, and includes a GEO-GEO communication device to perform bidirectional communication between artificial satellites adjacent to each other over the equator, the geostationary satellite group forms a circular communication network over the equator, each low-earth-orbit satellite configuring the low-earth-orbit satellite group flies on any of a plurality of orbit planes arranged in a distributed manner to the longitudinal direction, each low-earth-orbit satellite orbiting in a low-earth orbit on each orbit plane of the plurality of orbit planes performs bidirectional communication with each of the low-earth-orbit satellites flying at front and rear of each low-earth-orbit satellite to form a circular communication network, and each orbit plane of the plurality of orbit planes performs interorbital communication with another orbit plane, and the low-earth-orbit satellite group thereby forms a mesh communication network, at least one geostationary satellite configuring the geostationary satellite group includes a GEO-LEO communication device to perform communication between the geostationary satellite and the low-earth-orbit satellite, at least one low-earth-orbit satellite configuring the low-earth-orbit satellite group includes the GEO-LEO communication device, the geostationary satellite group and the low-earth-orbit satellite group perform bidirectional communication by using the GEO-LEO communication devices, at least one low-earth-orbit satellite configuring the low-earth-orbit satellite group includes an edge server, the low-earth-orbit satellite group collects data indicating a distribution request from at least one user device configuring an upload device group configured of at least one upload device that is present on ground, and uploads the collected data to a target edge server, which is an edge server included in the geostationary satellite configuring the geostationary satellite group, each upload device configuring the upload device group is any of an edge server and a user device, and the geostationary satellite group distributes, to each upload device having uploaded the data indicating the distribution request to the target edge server, an on-demand content corresponding to the distribution request indicated by the data uploaded by each upload device.

26. A business device to perform on-demand distribution in the space data center according to claim 25, the business device comprising:

a communication-line-use monitor device to measure communication traffic of on-demand contents and to record data indicating a result of the measurement; and a server-use monitor device to record a data amount of each on-demand content and data indicating a retention period of each on-demand content.

27. A space data center business device configured of all or part of a content business device, a network business device, and a server business device that perform on-demand distribution in the space data center according to claim 26.

28. A business device configuring the space data center business device according to claim 27, wherein the business device is any of the content business device, the network business device, and the server business device.

* * * * *